(12) United States Patent
Arun

(10) Patent No.: US 9,417,911 B2
(45) Date of Patent: Aug. 16, 2016

(54) SYSTEMS AND METHODS FOR SCALABLE ASYNCHRONOUS COMPUTING FRAMEWORK

(71) Applicant: Live Planet LLC, Los Angeles, CA (US)

(72) Inventor: Rohan Maroly kovumal Arun, Calabasas, CA (US)

(73) Assignee: LIVE PLANET LLC, Los Angeles, CA (US)

( * ) Notice: Subject to any disclaimer, the term of this patent is extended or adjusted under 35 U.S.C. 154(b) by 0 days.

(21) Appl. No.: 14/537,768

(22) Filed: Nov. 10, 2014

(65) Prior Publication Data

US 2015/0261571 A1    Sep. 17, 2015

Related U.S. Application Data

(60) Provisional application No. 61/952,055, filed on Mar. 12, 2014.

(51) Int. Cl.

| | |
|---|---|
| *G06T 1/20* | (2006.01) |
| *G06F 9/48* | (2006.01) |
| *H04L 29/08* | (2006.01) |
| *G06F 3/14* | (2006.01) |
| *G06T 7/00* | (2006.01) |
| *G06T 15/08* | (2011.01) |
| *G06T 17/10* | (2006.01) |
| *G06T 15/00* | (2011.01) |
| *G06F 9/445* | (2006.01) |

(52) U.S. Cl.
CPC ............ *G06F 9/4881* (2013.01); *G06F 3/1438* (2013.01); *G06F 3/1446* (2013.01); *G06F 3/1454* (2013.01); *G06F 9/445* (2013.01); *G06T 1/20* (2013.01); *G06T 7/0046* (2013.01); *G06T 15/005* (2013.01); *G06T 15/08* (2013.01); *G06T 17/10* (2013.01); *H04L 67/1002* (2013.01); *G06T 2200/16* (2013.01); *G06T 2207/10024* (2013.01); *G06T 2210/52* (2013.01)

(58) Field of Classification Search
None
See application file for complete search history.

(56) References Cited

U.S. PATENT DOCUMENTS

| | | | |
|---|---|---|---|
| 7,777,741 B2 | 8/2010 | Teler et al. | |
| 8,798,965 B2 | 8/2014 | Quan et al. | |
| 9,087,401 B1 | 7/2015 | Zheng et al. | |
| 9,147,268 B2 * | 9/2015 | Chen | G06T 11/005 |
| 2002/0015055 A1 * | 2/2002 | Foran | G06T 15/00 345/679 |
| 2005/0041031 A1 * | 2/2005 | Diard | G06T 15/005 345/505 |

(Continued)

OTHER PUBLICATIONS

International Search Report and Written Opinion dated Jun. 19, 2015, from related International Application No. PCT/US2015/019511.

(Continued)

*Primary Examiner* — Joni Richer
(74) *Attorney, Agent, or Firm* — Foley & Lardner LLP

(57) ABSTRACT

Systems and methods are described for a distributed data processing method, including, but not limited to: receiving, by a backend device, source data; partitioning, by the backend device, the source data into a plurality of data threads; sending, by the backend device, at least one of the plurality of data threads to each of a plurality of user devices; and determining, by the backend device, a job outcome for the source data based on a plurality of data thread results, each of the plurality of data thread results is determined by one of the plurality of user devices based on the at least one of the plurality of data threads.

21 Claims, 10 Drawing Sheets

(56) References Cited

U.S. PATENT DOCUMENTS

| | | | |
|---|---|---|---|
| 2005/0052452 | A1 | 3/2005 | Baumberg |
| 2006/0221073 | A1 | 10/2006 | Teler et al. |
| 2007/0005795 | A1 | 1/2007 | Gonzalez |
| 2007/0195099 | A1* | 8/2007 | Diard .................... G06T 1/20 345/501 |
| 2008/0168135 | A1 | 7/2008 | Redlich et al. |
| 2009/0002263 | A1* | 1/2009 | Pasetto ................ G06F 3/1438 345/1.3 |
| 2009/0109219 | A1 | 4/2009 | DeCoro et al. |
| 2009/0135180 | A1* | 5/2009 | Li .......................... G06T 15/08 345/420 |
| 2009/0160866 | A1 | 6/2009 | Pau et al. |
| 2010/0001995 | A1* | 1/2010 | Hamill ................. G06T 15/005 345/419 |
| 2010/0141665 | A1* | 6/2010 | Madruga ................ H04L 67/36 345/505 |
| 2010/0328325 | A1* | 12/2010 | Sevigny ................... G06T 1/20 345/522 |
| 2011/0115792 | A1* | 5/2011 | Tamaoki ................. G06T 15/60 345/426 |
| 2011/0145878 | A1* | 6/2011 | Gronning ....... H04N 21/234363 725/116 |
| 2012/0041722 | A1 | 2/2012 | Quan et al. |
| 2012/0131591 | A1 | 5/2012 | Moorthi et al. |
| 2013/0038686 | A1* | 2/2013 | Chen .................... H04N 19/597 348/43 |
| 2014/0040357 | A1 | 2/2014 | McDowell |
| 2014/0071234 | A1* | 3/2014 | Millett .................... G01S 17/89 348/43 |

OTHER PUBLICATIONS

International Search Report and Written Opinion dated Jun. 15, 2015, from related International Application No. PCT/US2015/019531.
International Search Report and Written Opinion dated Jun. 19, 2015, from related International Application No. PCT/US2015/019525.
US Office Action dated Apr. 4, 2016 from related U.S. Appl. No. 14/557,238.

* cited by examiner

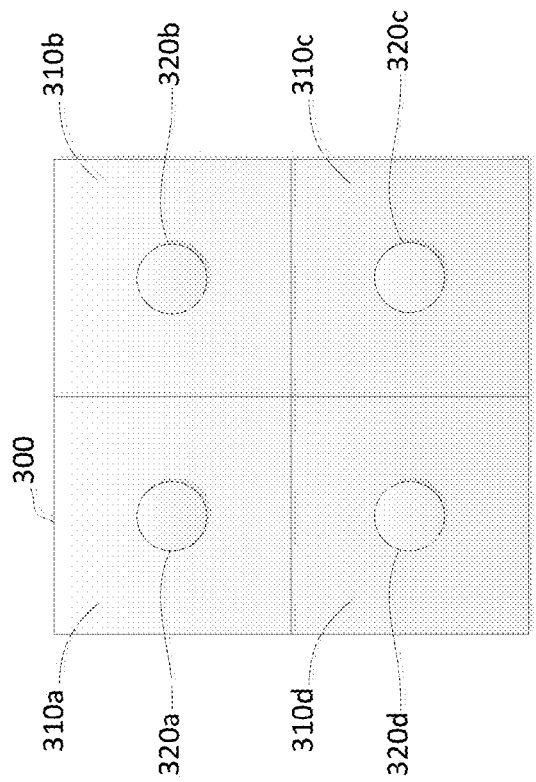
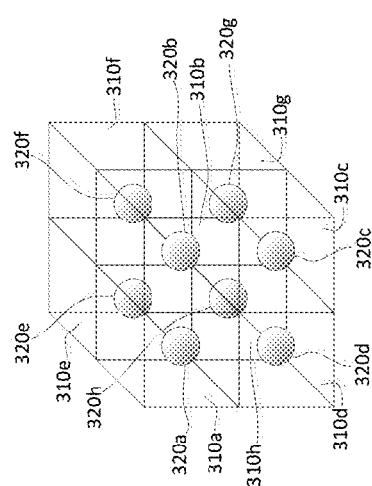
FIG. 3B
FIG. 3A

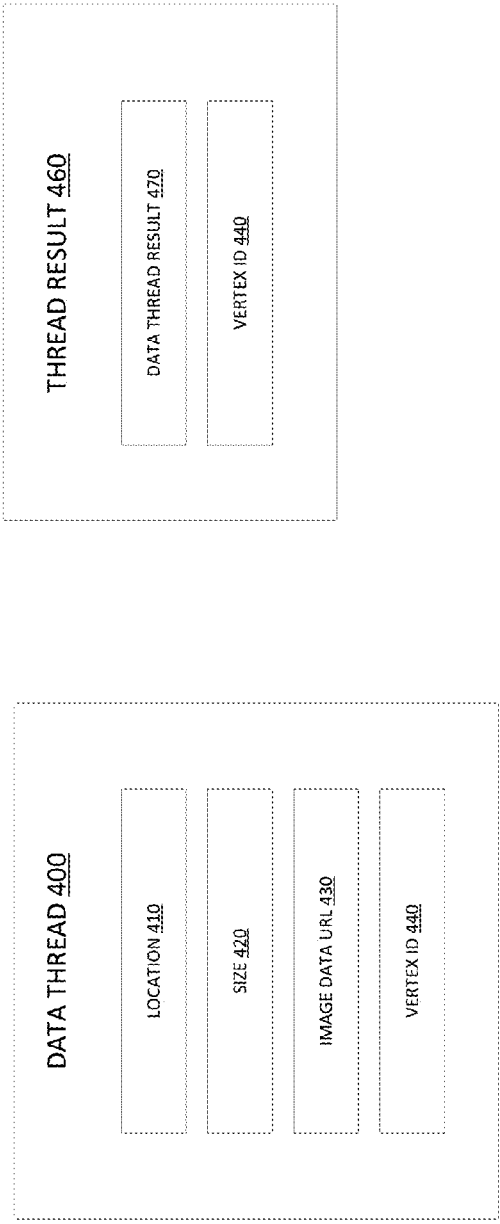

| IP Address | Total Cores | Execution Time (ms) | Data Threads Processed/Assigned | FPS |
|---|---|---|---|---|
| 75.82.189.xx | 32 | 25.2 | 475/475 | 40.41 |
| 75.82.193.xx | 32 | 24.3 | 415/475 | 34.40 |
| 75.83.002.xx | 40 | 30.1 | 141/300 | 58.82 |
| 79.51.441.xx | 16 | 41.7 | 150/150 | 20.51 |
| 79.61.525.xx | 4 | 39.4 | 10/100 | 17.57 |
| SHOW MORE | | | | |

SYSTEMS AND METHODS FOR SCALABLE ASYNCHRONOUS COMPUTING FRAMEWORK

CROSS-REFERENCE TO RELATED PATENT APPLICATIONS

This application claims priority from Provisional Application No. 61/952,055, filed Mar. 12, 2014, incorporated herein by reference in its entirety.

BACKGROUND OF THE INVENTION

1. Field of the Invention

Embodiments relate generally to large scale distributed computing frameworks, and more specifically, to scalable asynchronous computing frameworks using idle cores available within a network.

2. Background

Various distributed computing frameworks have been developed to perform certain complex (large-scale) computing tasks. Such distributed computing frameworks harness the processing power of a large number of cores to process complex computing tasks, which can require a tremendous amount of processing power. In particular, the complex computing tasks can be distributed to a plurality of cores for processing.

While distributed computing frameworks have been employed for certain complex computing tasks, the distributed computing frameworks can encounter capacity issues when the computing tasks are extremely complex. Given that a data processing center (e.g., Google Brain) may include a limited number of cores (e.g., 16,000 cores), the total processing power of the distributed computing framework is limited to the number of cores supported by the data processing center.

SUMMARY OF THE DISCLOSURE

Embodiments described herein relate to distributed data processing using distributed computing frameworks. The distributed computing framework may include a backend device (e.g., a centralized server) provided to partition a computing task into a plurality of blocks (e.g., smaller concrete tasks). The backend device may distribute each of the blocks to one of a group of user devices via a network. The backend device may distribute the blocks based on processing power and network conditions associated with each of the user devices.

The distributed computing frameworks may be implemented to solve numerous computing tasks requiring tremendous processing power. In non-limiting embodiments, the distributed computing frameworks may be implemented for 3-dimensional space imaging, processing, and displaying processes. In particular, a target (3-dimensional) space is partitioned to include a plurality of vertices. Data (e.g., image data, video data, and/or the like) relating to the target space is captured by source devices (e.g., cameras). Each image or frame of a video may include a plurality of pixels, each pixel may be associated with one of the plurality of vertices. Data threads (one or more of which may form a block) may be generated by the backend device for distribution among various the user devices, where each data thread may correspond to data (e.g., pixel data) related to a vertex.

Each user device may compute a data result (e.g., a weighting value) of the data thread(s) assigned to the user device and transmit the data result back to the backend device. The backend device may determine a job outcome based on the plurality of data results received from the user devices. The backend device can, then, store the job outcome for future or real-time displaying (when the job outcome corresponds to processed image/video) on user devices. In some embodiments, the backend device may not be capable of displaying the data. The backend device may maintain the processing scheduling and data locations. Such data may be stored locally to the backend device or in a remote data storage (e.g., in another node within the network).

In some embodiments, the backend device may send the job outcome to at least some of the user devices for consumption. In other embodiments, the job outcome may not be sent to the user devices. The entities associated with the backend device or a third party may consume the job outcome. In these case, the user devices (or other nodes within the network) may not receive partial or complete job outcomes. In particular embodiments, the user devices may display a 3-dimensional projection (in the form of a video) of the target space based on the job outcome relating to the colors, textures, frequency transforms, wavelet transforms, averages, standard deviations of the vertices.

In some embodiments, the count of user devices and the data processing required to process the source data may be dynamic (e.g., change over time). Thus, the distributed computing framework may increase in scale as more user devices become available, vice versa. In various embodiments, when a threshold minimum number of user devices is not achieved for processing a given computing task in real time, dedicated user devices may be added for competing the computing tasks.

A method for processing data, the method includes, but not limited to: receiving, by a backend device, source data; partitioning, by the backend device, the source data into a plurality of data threads; sending, by the backend device, at least one of the plurality of data threads to each of a plurality of user devices; and determining, by the backend device, a job outcome for the source data based on a plurality of data thread results, each of the plurality of data thread results is determined by one of the plurality of user devices based on the at least one of the plurality of data threads.

In some embodiments, the source data is video data; and the data job includes image processing for a frame of the video data.

According to some embodiments, partitioning of the source data into the plurality of data threads includes partitioning the frame into a plurality of areas based on metadata associated with the frame and the plurality of areas, each of the plurality of areas corresponds to one of the plurality of data threads.

In some embodiments, the partitioning of the source data into the plurality of data threads includes partitioning the source data based on pixels of the source data.

According to various embodiments, the frame is an image of a target space.

In some embodiments, the target space includes of a plurality of vertices; and each of the plurality of vertices corresponds to a 3-dimensional portion of the target space.

In some embodiments, each of the plurality of data threads is associated with at least one of the plurality of vertices; and each of the plurality of data threads corresponds to an area of the frame.

In some embodiments, each of the data thread results is determined by determining a weighting value associated with at least one display characteristics associated with the area of the frame.

In some embodiments, the display characteristics includes at least a color associated with the area of the frame.

In multiple embodiments, the frame captures at least some of the plurality of vertices.

In various embodiments, the user device displays a 3-dimensional projection of the target space based on the job outcome.

According to some embodiments, determining the job outcome includes: receiving, by the backend device, the plurality of data thread results from the plurality of user devices; and determining the job outcome for the data job based on the received plurality of data thread results.

In some embodiments, sending the at least one of the plurality of data threads includes: determining at least one of processing power and network conditions for each of the plurality of user devices; and assigning each of the plurality of user devices at least one of the plurality of data threads based on at least one of the processing power and the network conditions.

In some embodiments, the method of claim further comprises formatting the source data into graphic processing unit (GPU)-compatible format, wherein each of the plurality of data thread results is determined by at least one GPU associated with each of the plurality of user devices.

In some embodiments, the GPU-compatible format is associated with shader language.

In various embodiments, the source data is formatted into at least one of the following elements: geometry, vertices, textures, normals, and code for the shader language.

In some embodiments, the data thread results are determined by rendering the data thread results to a display screen of the user devices; and copying the data thread results rendered to the display screen.

According to some embodiments, the method further comprises receiving, by the backend device, the plurality of data thread results after the plurality of data thread results have been rendered to the display screen associated with each of the user devices.

An apparatus for processing data is described with respect to various embodiments, the apparatus including, but not limited to: a backend device, the backend device is configured to: receive source data; partition the source data into a plurality of data threads; send at least one of the plurality of data threads to each of a plurality of user devices; determine a job outcome for the source data based on a plurality of data thread results, each of the plurality of data thread results is determined by one of the plurality of user devices based on the at least one of the plurality of data threads; and send the job outcome to at least one of the plurality of user devices.

Various embodiments are directed to a non-transitory computer-readable storage medium storing program instructions that, when executed, causes a processor to: receive source data; partition the source data into a plurality of data threads; send at least one of the plurality of data threads to each of a plurality of user devices; determine a job outcome for the source data based on a plurality of data thread results, each of the plurality of data thread results is determined by one of the plurality of user devices based on the at least one of the plurality of data threads; and send the job outcome to at least one of the plurality of user devices.

BRIEF DESCRIPTION OF THE DRAWINGS

FIG. 3A is a schematic block diagram illustrating a perspective view of a target space according to various embodiments.

FIG. 3B is a schematic block diagram illustrating a frontal view of the target space according to some embodiments.

FIG. 4A is a schematic block diagram illustrating an example of a data thread according to various embodiments.

FIG. 4B is a schematic block diagram illustrating an example of a thread result according to various embodiments.

DETAILED DESCRIPTION

Figure 1:
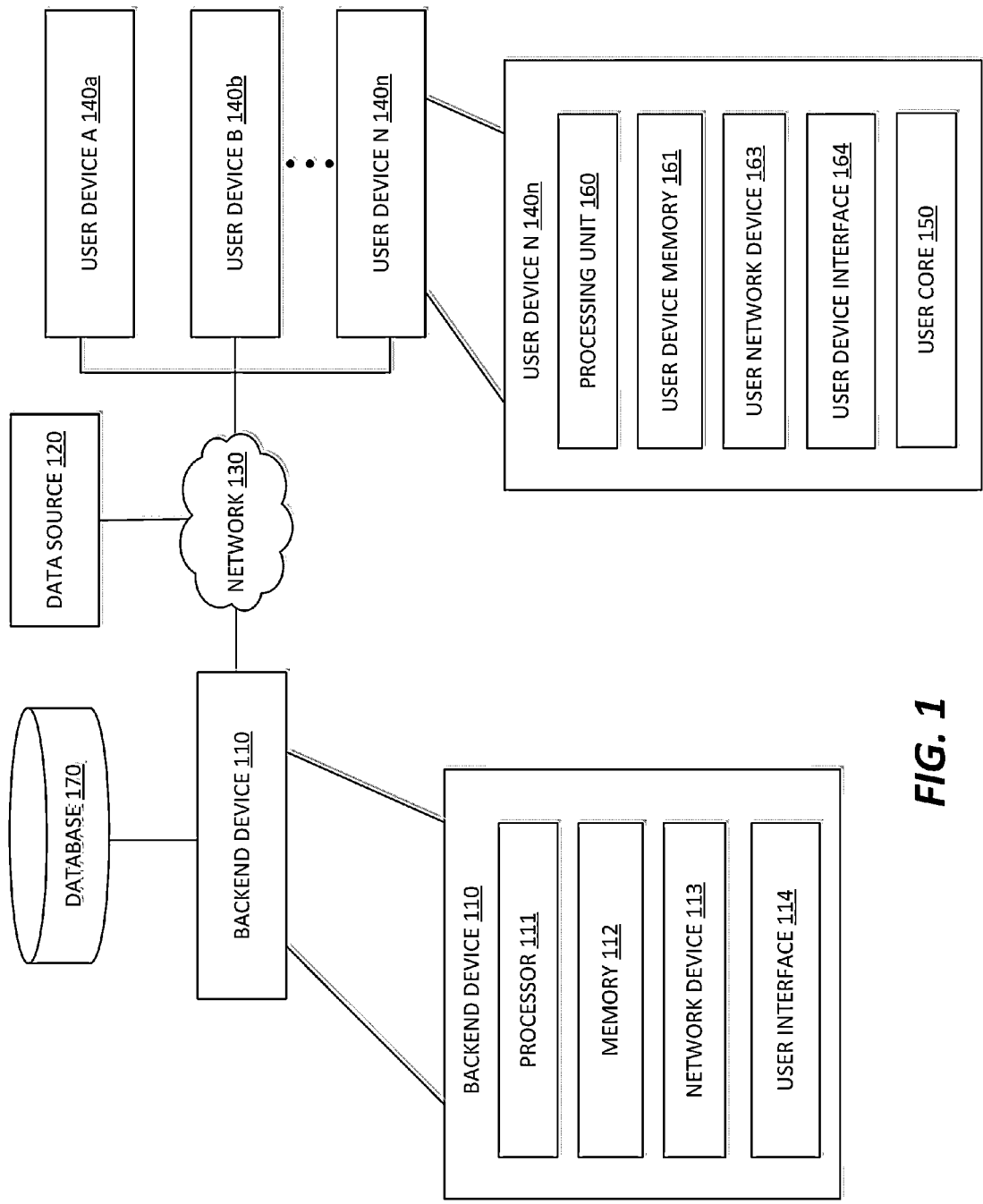
FIG. 1 is a schematic block diagram illustrating an example of a distributed computing framework according to various embodiments.

In the following description of various embodiments, reference is made to the accompanying drawings which form a part hereof and in which are shown by way of illustration specific embodiments in which the invention may be practiced. It is to be understood that other embodiments may be utilized, and structural changes may be made without departing from the scope of the various embodiments disclosed in the present disclosure.

As referred to herein, a "user core" may be at least one data processing unit such as, but not limited to, a microprocessor, a central data processing unit, a graphics processing unit (GPU), other types of processors, a combination thereof, or the like. In particular embodiments, a user core may be a GPU core directly assessable via a browser application without loading additional software programs or plug-ins. A "user device" may be any mobile or non-mobile computing device connected to a network (e.g., any public or private network). In some embodiments, the user device may access services provided by a backend device. The services may include, but not limited to, data transfer services, video streaming services, a combination thereof, and/or the like. Each user device may include one or more user cores for processing tasks of the user device.

A "data thread" may refer to a unit of data assigned to be processed by a user core. The data threads may be selected and assigned to a particular user core (or user device) by the backend device. In some non-limiting examples, the data thread may include a portion of an image (e.g., a fraction of a pixel, pixel(s), macroblock(s), and the like), chunks of a video, abstract data points arranged in video-like streams, metadata corresponding therewith, and/or the like. A "data block" may be a unit of data including at least one data thread. A "data job" may be any coherent computing tasks that can be segmented into a plurality of data threads/blocks for processing by the user cores. For example, a data job may be a processing task for processing at least one pixel, macroblock, frame of video data, 3-dimensional projections, filtering images, object identification for images, and/or the like.

As shown in a non-limiting example, a data job may be processing an image having a size of 1920p by 1080p. A data block may be an area on the image having a size of 128p by 128p. And within the data block, each pixel may be associated with a data thread. Thus, the data job of processing the image may be divided into 125 processing blocks, where each of the data blocks may be processed in a single frame on a single user device in the manner described (Each user device may process anywhere between 5 frames to more than 120 frames per second of any data available in any processing task it is subscribed to). Subscription to processing data jobs may be provided (e.g., hardcoded) into a website, which may include many user devices being connected to it (a lot of web traffic).

Embodiments of the current disclosure relate to systems and methods for enabling scalable distributed computing frameworks using web cores. Breakthroughs in bandwidth and web technologies allow asynchronous parallel processing framework scalable across user cores within a network. The user cores may be components of user devices, which may be operated by users to access services (e.g., web services such as video streaming services) provided within the network. Therefore, the processing power of the distributed computing framework increases with the number of user devices connected to the network (using the services provided within the network). In various embodiments, the number of user cores may be in the millions.

Implementations of the distributed computing framework include, but not limited to, large-scale image processing, web rendering, 3-dimensional WebGL rendering, deep learning neural network, image recognition, image filtering, and other suitable users described herein. In specific implementations, the distributed computing framework as described herein may be capable of processing data (e.g., video/image data) in real time, such as to provide real-time services (e.g., streaming services). For example, the user device (e.g., through the user cores) may be configured to process a portion of data used to provide the real-time streaming services. The processed data (e.g., the job outcome) may be received by the user device for providing the real-time services as described. One of ordinary skill in the art appreciates that the job outcome may not be required to be sent to the user device. The user device may be compensated in other ways such as, but not limited to, monetary compensation, services, a combination thereof, and/or the like.

In various embodiments, the processing power of each user device depends on the total processing power of the user core(s), the current processing power of the user core(s), network bandwidth status, a combination thereof, and/or the like. In typical embodiments, the distributed computing frameworks may require a small portion of the user core's processing power (e.g., the total processing power or the current processing power) such that the distributed processes assigned to the particular user device does not interfere substantially with the ordinary processes of the user core. In often cases, the users of the user devices would not be able to notice that the distributed processes are executed on the user devices.

FIG. 1 is a schematic block diagram illustrating an example of a distributed computing framework 100 according to various embodiments. Referring to FIG. 1, the distributed computing framework 100 may include at least a backend device 110, a data source 120, a plurality of user devices (e.g., user device A 140a, user device B 140b, . . . , user device N 140n, and the like).

In some embodiments, a network 130 may allow data transfer between the backend device 110 and the user devices 140a-140n. In further embodiments, the network 130 may also allow data transfer between the data source 120 and the backend device 110. In still further embodiments, the network 130 may enable data transfer between the database 170 and the backend device 110. The user devices 140a-140n may be connected to each other through the network 130. The network 130 may be a wide area communication network, such as, but not limited to, the Internet, or one or more Intranets, local area networks (LANs), ethernet networks, metropolitan area networks (MANs), a wide area network (WAN), combinations thereof, and/or the like. In particular embodiments, the network 130 may represent one or more secure networks configured with suitable security features, such as, but not limited to firewalls, encryption, or other software or hardware configurations that inhibits access to network communications by unauthorized personnel or entities. The data transmittable over the network 130 may be encrypted and decrypted within shader language on user cores 150 of the user devices 140a-140n using per frame keys, further securing the data.

The data source 120 may be connected to the user devices 140a-140n (e.g., via the network 130 or otherwise) for providing source data to be processed by the user devices 140a-140n of the distributed computing framework 100. For example, the data source 120 may include any suitable sources or devices for outputting unprocessed data such as, but not limited to, image/video data, application data, and/or the like. In particular embodiments, the data source 120 may include at least one camera for capturing video, image, and/or audio data. Other data sources include, but are not limited to, currency exchange rates, weather sensor data, genetic material sequencing, a combination thereof, and/or the like. The data source 120 may include a database/server for storing captured output data (e.g., the actual source data).

In some embodiments, the data sources 120 may be connected to the backend device 110 (e.g., via the network). The backend device 110 may generate metadata based on the actual data outputted by the data source 120 (and stored in the database/server associated with the data source 120). The backend device 110 may transmit metadata (e.g., indicating particularly the partitioned data blocks/treads) to the user devices 140a-140n. The user devices 140a-140n may retrieve the actual data from the data source 120 (e.g., from the server/database associated with the data source) for processing as described herein.

In other embodiments, the data source 120 may include at least one of the user devices 140a-140n having any suitable types of image/video/audio capturing capabilities (e.g., smartphone cameras). In such embodiments, the at least one of the user devices 140a-140n may consume its own output for processing in the manner described without retrieving the actual data from the remote data source 120. Whereas the at least one of the user devices 140a-140n does not consume the whole output, the backend device 110 may generate metadata such that other user devices may retrieve at least a portion of the output from the at least one of the user devices 140a-140n for processing.

The backend device 110 may include at least one processor 111, memory 112 operatively coupled to the processor 111, at least one network device 113, at least one user interface 114, and/or the like. In some embodiments, the backend device 110 may include a desktop computer, mainframe computer, laptop computer, pad device, smart phone device or the like, configured with hardware and software to perform operations described herein.

For example, the backend device 110 may include typical desktop PC or Apple™ computer devices, having suitable processing capabilities, memory, user interface (e.g., display and input) capabilities, and communication capabilities, when configured with suitable application software (or other software) to perform operations described herein. Platforms suitable for implementation include Amazon/Debian Linux, HTML (e.g., HTML5), suitable browsers without plug-ins (such as java or flash), or the like. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the backend device 110 may relate to systems and process that are implemented with dedicated device hardware specifically configured for performing operations described herein.

The processor 111 may include any suitable data processing device, such as a general-purpose processor (e.g., a microprocessor), or executing the functions of the backend device 110 as described. In the alternative, the processor 111 may be any conventional processor, controller, microcontroller, or state machine. The processor 111 may also be implemented as a combination of computing devices, e.g., a combination of a DSP and a microprocessor, a plurality of microprocessors, a GPU, at least one microprocessors in conjunction with a DSP core, or any other such configuration.

The memory 112 may be operatively coupled to the processor 112 and may include any suitable device for storing software and data for controlling and use by the processor 111 to perform operations and functions described herein, including, but not limited to, random access memory (RAM), read only memory (ROM), floppy disks, hard disks, dongles or other recomp sensor board (RSB) connected memory devices, or the like.

The network device 113 may be configured for communication over the network 130. The network device 113 may include interface software, hardware, or combinations thereof, for communication over the network 130. The network device 113 may include hardware such as network modems, wireless receiver or transceiver electronics, and/or software that provide wired or wireless communication link with the network 130 (or with a network-connected device). In particular embodiments, the network device 113 may be coupled to the processor 111 for providing communication functions. The network device 113 may provide telephone and other communications in accordance with typical industry standards, such as, but not limited to code division multiple access (CDMA), time division multiple access (TDMA), frequency division multiple access (FDMA), long term evolution (LTE), wireless fidelity (WiFi), frequency modulation (FM), Bluetooth (BT), near field communication (NFC), and the like.

In particular embodiments, the user interface 114 of the backend device 110 may include at least one display device. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like.

In some embodiments, the user interface 114 of the backend device 110 may include at least one user input device that provides an interface for designated personnel using the backend device 110. The user input device may include any suitable device that receives input from a user including, but not limited to one or more manual operator (such as, but not limited to a switch, button, touchscreen, knob, slider, keyboard, mouse, or the like), microphone, camera, image sensor, any types of remote connection control, or the like.

Still referring to FIG. 1, in addition to (or as an alternative to) the memory 112, the backend device 110 may be operatively coupled to the at least one database 170. In some embodiments, the database 170 may be connected to the backend device 110 through the network 130. In other embodiments, the database 170 may be connected to the backend device 110 in other suitable manners not through the network 130. The database 170 may be capable of storing a greater amount of information and provide a greater level of security against unauthorized access to stored information than the memory 112 in the backend device 110. The database 170 may include any suitable electronic storage device or system, including, but not limited to random access memory RAM, read only memory ROM, floppy disks, hard disks, dongles or other RSB connected memory devices, or the like.

In particular embodiments, the database 170 may be a NoSql database maintained by a redis server to control alerting user devices 140a-140n of new data blocks/threads and prioritizing data blocks/threads. The user devices 140a-140n may be capable to interact with the redis server to store and access data in an asynchronous manner (e.g., no bottlenecks given metadata is being maintained by the database 170 and/or the memory 112; the actual data may be stored in the data sources 120). The algorithms for such access may be structured such that no data hazards are present from overlaps. Atomic instructions may be included to avoid collision hazards.

The database 170 and/or the memory 112 may be configured to store source data (e.g., unprocessed data) from the data source 120. In some embodiments, the source data may be stored in either the database 170 or the memory 112. In other embodiments, at least a portion of the source data may be stored in one of the database 170 and the memory 112, while a separate portion of the source data may be stored in another one of the database 170 or the memory 112.

In further embodiments, the database 170 and/or the memory 112 may be configured to store segmented data threads to be send to the user devices 140a-140n through the network 130. The processor 111 may partition the source data (e.g., data job) into a plurality of data threads. Each data thread may be sent to one of the user devices 140a-140n for processing. In various embodiments, the database 170 and/or the memory 112 may store only the metadata required to identify the source data. The source data itself may be hosted on a content delivery network (CDN) or another server/database residing within the data source 120. The user devices 140a-140n may pull (e.g., request from the backend device 110) data blocks/threads as they become available in the manner described. This may be advantageous due to unequal processing time associated with each user core 150 of each of the user devices 140a-140n. Alternatively, the backend device 110 may push the data blocks/threads to the user devices 140a-140n. Once partitioned, the data threads may be stored and indexed within the database 170 and/or the memory 112 until the data threads are processed by one of the user devices 140a-140n. Given that a user device referred to generally as the user device 140n may be unable to process the data thread for various reasons, the database 170 and/or the memory 112 may store an assigned but not yet processed data thread until the data thread has been processed. In still further embodiments, the database 170 and/or the memory 112 may store processed data thread results received from the user devices.

In some embodiments, data threads and/or data blocks may be stored as lists of data on the backend device 110, which may take form of a NoSql server with a redis server maintaining asynchronous communication between the user devices and the NoSql server. NoSql server may be used in some embodiments by virtue of its ability to allow fast access to flattened data structures. The backend device 110 (or at least a portion thereof) may be set up over a CDN, or data contained within the backend device 110 or the associated database 170 may be copied to other data centers spread around the world to eliminate any single points of failure. As such, persistent memory may be achieved for data processing even if a single node server containing data becomes offline. In various embodiments, each data thread/block may include only the minimum indexing information (e.g., metadata) needed for the user devices 140a-140n to retrieve or otherwise obtain the correct data to be processed and/or output data. In addition, any other metadata/parameter necessary for processing the data thread (e.g., scripts, instructions, parameters, algorithms, location to store output data, a combination thereof, and/or the like) may be included in each data thread/block. Accordingly, the user devices 140a-140n, upon receiving the data blocks/threads (which include the metadata pointing the location of the actual data), may retrieve or otherwise access the actual data (located at a server/database/network other than the backend device 110, for example, at the data sources 120) based on the metadata in the data blocks/threads.

Each of the user devices 140a-140n (e.g., as depicted with respect to the user device n 140n) may include at least one processing unit 160, user device memory 161 operatively coupled to the processing unit 160, user network device 163, user device interface 164, and user core 150. The user devices 140a-140n may be dedicated or general user devices connected to the network 130. In the event that a number of the general user devices do not meet a predetermined threshold for processing a certain computing task, additional dedicated user devices may be added (to meet the predetermined threshold, or beyond).

The processing unit 160 may be configured to execute general functions of the user devices 140a-140n. The processing unit 160 may be any suitable data processing device, such as a general-purpose processor, microprocessor, GPU, or the like. In the alternative, the processing unit 160 may be any conventional processor, controller, microcontroller, or state machine. The processing unit 160 may also be implemented as a combination of computing devices, e.g., a combination of a DSP and a microprocessor, a plurality of microprocessors, at least one microprocessors in conjunction with a DSP core, or any other such configuration. In particular embodiments, the processing unit 160 may refer to the GPU of the user devices 140a-140n. The GPU may be connected to the network 130 (e.g., the internet) via a browser without the need of plug-ins (e.g., java or flash) using simply HTML5, as enabled by improved network capabilities (e.g., network speed). As such, the processes of the processing unit 160 may not be noticeable to the user of each of the user devices 140a-140n.

The user device memory 161 may be operatively coupled to the processing unit 160 and may include any suitable device for storing software and data for controlling and use by the processing unit 160 to perform operations and functions described herein. The user device memory 161 may be a RAM, ROM, floppy disks, hard disks, dongles or other RSB connected memory devices, or the like.

The user network device 163 may include interface software, hardware, or combinations thereof, for communication over the network 130. The user network device 163 may include network modem, wireless receiver or transceiver electronics, and/or software that provide wired or wireless communication link with the network 130 (or with a network-connected device). In particular embodiments, the user network device 163 may be coupled to the processing unit 160 for providing communication functions. The user network device 163 may provide communications in accordance with typical industry standards, such as, but not limited to, CDMA, TDMA, FDMA, LTE, WiFi, FM, BT, NFC, and/or the like. In some embodiments, the network 130 may be the internet, as the user devices 140a-140n may be spread out geographically using optimal bandwidth. In other embodiments, the network 130 may be a limited local network. The local network may be related to other private networks or the internet in general.

In further embodiments, each of the user devices 140a-140n may include, additionally, plug-ins and hardware to accelerate GPU (e.g., the user core 150) processing. The additional plug-ins may provide access to lower level optimized functions within the user devices 140a-140n. The additional hardware may boost the performance for the user core 150. The user devices 140a-140n may also be head nodes of a data center, which processes the data blocks/threads sent to the user devices 140a-140n and relays the data blocks/threads back to the user devices 140a-140n to relay back to the backend device 110.

In particular embodiments, the user device interface 164 of the user devices 140a-140n may include at least one display device for displaying information (e.g., text and graphics) to the users. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like.

In some embodiments, the user device interface 164 of the user devices 140a-140n may include at least one user input device that provides an interface for accepting inputs of the users. The user input device may include any suitable device that receives input from a user including, but not limited to one or more manual operator (such as, but not limited to a switch, button, touchscreen, knob, slider, keyboard, mouse, or the like), microphone, camera, image sensor, and/or the like.

The user core 150 may be configured to execute data thread processing functions of the user devices 140a-140n as described. The user core 150 may be the same as the processing unit 160 in some embodiments. In other embodiments, the user core 150 may be a processing device separate from the processing unit 160. The user core 150 may be any suitable data processing device for processing data threads, such as at least one general-purpose processor, microprocessor, GPU, or the like. In the alternative, the user core 150 may be any conventional processor, controller, microcontroller, or state machine. The user core 150 may also be implemented as a combination of computing devices, e.g., a combination of a DSP and a microprocessor, a plurality of microprocessors, at least one microprocessors in conjunction with a DSP core, or any other such configuration.

In particular embodiments, each of the user devices 140a-140n may be any wired or wireless computing systems or devices. In some embodiments, the user devices 140a-140n may be a desktop computer, mainframe computer, laptop computer, pad device, or the like, configured with hardware and software to perform operations described herein. For example, each of the user devices 140a-140n may include typical desktop PC or Apple™ computer devices, having suitable processing capabilities, memory, user interface (e.g., display and input) capabilities, and communication capabilities, when configured with suitable application software (or other software) to perform operations described herein. In other embodiments, the user devices 140a-140n may include a mobile smart phone (such as, but not limited to an iPhone™, an Android™ phone, or the like) or other mobile phone with suitable processing capabilities. Typical modern mobile phone devices include telephone communication electronics as well as some processor electronics, one or more display devices and a keypad and/or other user input device, such as, but not limited to described above. Particular embodiments employ mobile phones, commonly referred to as smart phones, that have relatively advanced processing, input and display capabilities in addition to telephone communication capabilities. However, the user devices 140a-140n, in further embodiments of the present invention, may include any suitable type of mobile phone and/or other type of portable electronic communication device, such as, but not limited to, an electronic smart pad device (such as, but not limited to an iPad™), a portable laptop computer, or the like. Mobile GPU processing through native libraries as well as non-mobile GPU may be implemented to communicate on the same asynchronous network 130.

In some embodiments, the functions performed by the user devices 140a-140n can be implemented with minimal additional hardware costs by utilizing existing hardware. In other embodiments, systems and processes described herein can be implemented with dedicated device hardware specifically configured for performing operations described herein. Hardware and/or software for the functions may be incorporated in the user devices 140a-140n during manufacture of the user devices 140a-140n, for example, as part of the original manufacturer's configuration. Such hardware and/or software may also be added to the user devices 140a-140n, after original manufacture (e.g., installing one or more software applications onto the user devices 140a-140n).

Figure 2:
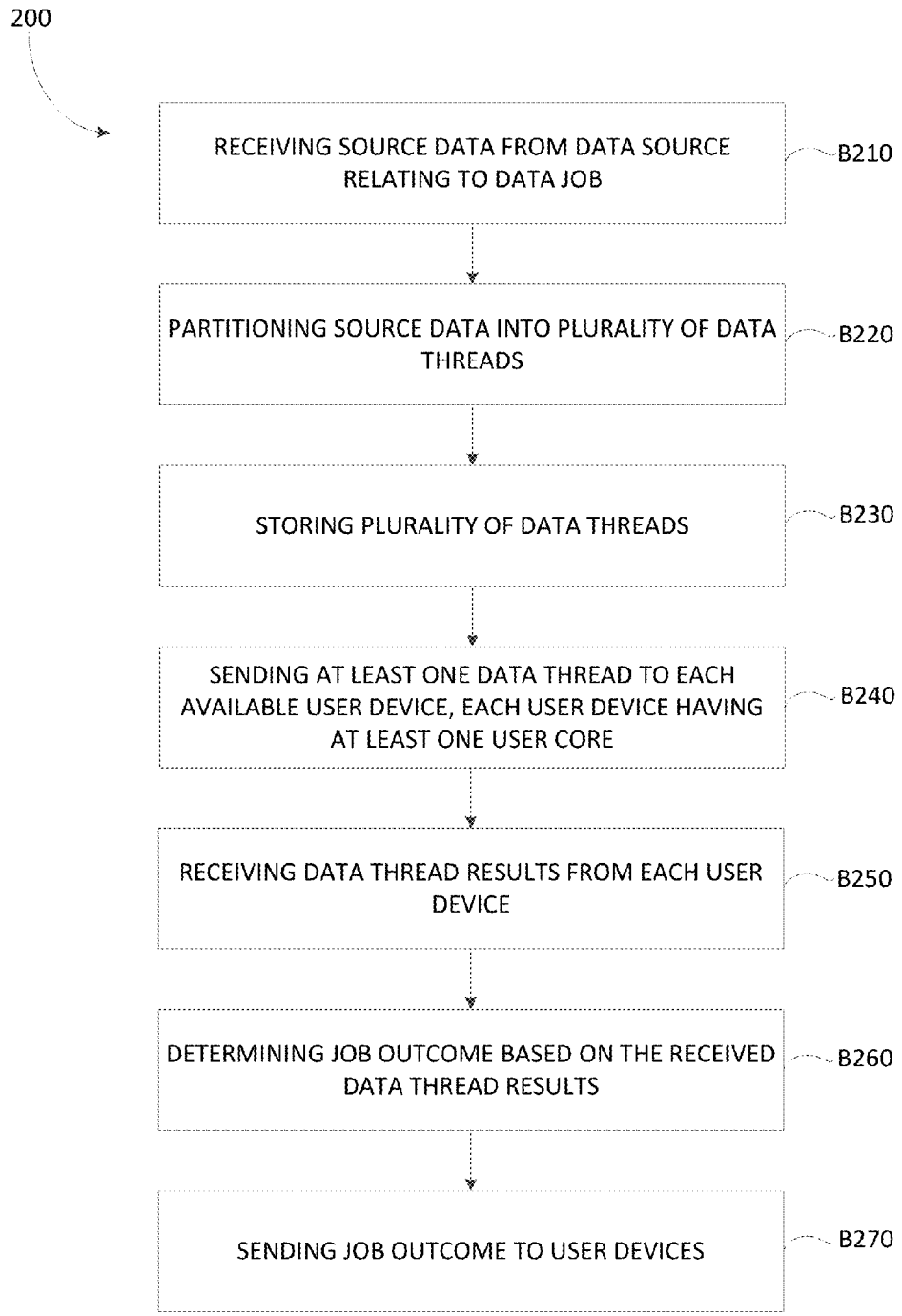
FIG. 2 is a process flow chart illustrating an example of a distributed data processing method according to various embodiments.

FIG. 2 is a process flow chart illustrating an example of a distributed data processing method 200 according to various embodiments. Referring to FIGS. 1-2, the distributed data processing method 200 may be implemented with the distributed computing framework 100. In a non-limiting example, the distributed data processing method 200 may be implemented for 3-dimensional real-time streaming systems and methods implementing display threshold techniques described herein.

In general terms, such 3-dimensional real-time streaming systems and methods may refer to the backend device 110 being configured to partition the 3-dimensional graphic construction process into smaller chunks (e.g., data threads) for processing by the plurality user devices 140a-140n (e.g., by the user cores 150). The backend device 110 may then receive the results (e.g., data thread results) for each of the smaller chunks from the user devices 140a-140n and compute the 3-dimensional re-construction data from the data thread results. Once computed, 3-dimensional re-construction data may be transmitted to each of the user devices 140a-140n for rendering 3-dimensional videos. It should be noted by one of ordinary skill in the art that the distributed data processing method 200 is applicable to other types of image data processing, and data processing in general.

First at block B210, the backend device 110 may receive source data from the data source 120 relating to a data job. In some embodiments, the source data may be any unprocessed data such as, but not limited to, image data, video data, audio date, application data, combination thereof, and/or the like. A data job may define a particular computing task definable within the source data. In a non-limiting example, whereas the source data is graphics (e.g., video) data, a data job may delineate the portion of the source data corresponding to a frame.

Next at block B220, the backend device 110 may be configured to partition the source data (e.g., each data job) into a plurality of data threads. In other words, the source data may be divided into a plurality of data jobs, and each data job may be partitioned into a plurality of data threads. Such divisions of the source data may serve to break down a complex computing task into smaller segments to be processed by the plurality of user cores 150, thus providing finer granularity and greater processing power. In particular embodiments, a unit of source data may be stored in the backend device 110, the database 170, or a third-party storage device in or not in the network 130. The partitioning of the unit of source data may include obtaining location indicators (e.g., URLs) for each discrete piece of the unit of source data. The discrete pieces (or the unit of source data itself) may not be in the data threads. However, the location indicators may be stored or transmitted as data threads. In other words, the partitioning concerns metadata instead of data in some embodiments. In other embodiments, the discrete pieces themselves are stored and transmitted as the data threads.

In a non-limiting example, a video stream (the source data) may be received as separate data jobs (e.g., separate frames, each frame is a data job). Each frame may further be divided based on vertices (e.g., data threads) for processing. A vertex may be a predetermined point within a target space (e.g., a sport stadium, and the like), where each vertex may be associated with a definable volume within the target space. Each vertex may correspond to portion of a pixel, pixel(s), or macroblock(s) as captured by a digital camera (the data source 120). In various embodiments, a data thread may be a unit of video image/video data with respect to one vertex as captured by one camera at a single frame.

Next at block B230, the backend device 110 may store the plurality of data threads in the database 170, the memory 112, a combination thereof, and/or the like. Given that there may not be as many user cores 150 available at a given time to process each data thread, all data threads may be stored. Some data threads may be processed immediate by assigning to available user cores 150 for processing. Other unassigned data threads may be stored in the database 170 or the memory 112 until a new user core 150 becomes available (e.g., by completing data thread processing of a previous data thread or by becoming connected to the network 130). All data threads may be stored as metadata, including input data location, scripts, instructions, parameters, algorithms, location to store output data, flags need to be set a combination thereof, and/or the like. The metadata locations may be removed as processed and outputs are stored, to optimize the periodization of new unprocessed data blocks/threads.

At block B240, the backend device 110 may be configured to send one of the plurality of data threads to each available user device 140n within the network 130, where each available user device 140n may include a user core 150. In various embodiments, the backend device 110 may identify the user devices 140a-140n within the network 130 in the manner described. The user devices 140n may be deemed available when the user device 140n has a free user core 150 to process the data threads. Data blocks/threads may be pushed down from the backend device 110 or pulled by the user devices 140a-140n from the backend device 110. The backend device 110 may periodically send the data blocks/threads to the user devices 140a-140n in a push, where each user device may receive and process the sent data blocks/threads when that user device is available. Alternatively, the user device may store the data blocks/threads for future processing. In other embodiments, each of the user devices 140a-140n may transmit a request to the backend device 110 (when data processing is complete) to receive a new data block/thread to process, in a pull. Pulling data blocks/threads by the user devices 140a-140n can be cost-efficient, given that the user devices 140a-140n may access metadata from the backend device 110 asynchronously, and that each of the user devices 140a-140n may process at different rates. The data sent to be backend devices 140a-140n may be based on a prioritized list of data blocks/threads in the manner described.

The backend device 110 may assign each available user device 140n a data thread based on the total processing power of the user core 150, the current processing power of the user core 150, network bandwidth status, a combination thereof, and/or the like. In some embodiments, the data thread may include embedded scripts or instructions for processing the data threads sent with the data thread to the user device. The data thread may include metadata/pointers of the scripts or instructions may be included in the data thread, such that the actual scripts or instructions may be stored in another server/database other than the backend device 110 and the database 170. The user devices 140a-140n may retrieve or otherwise access the actual scripts or instructions from the another server/database based on the location pointed by the metadata of the data thread. The scripts or instructions may be data thread-specific. In other embodiments, the instructions may be pre-stored in the user device memory 161 of the user devices 140a-140n. In some cases, a decryption key may also be sent with the data blocks/threads to decrypt the corresponding data blocks/threads with user core 150 (GPU) memory. The user core 150 may then process the data blocks/threads with the user core 150 and re-encrypt the block results for private or DRM-capable processing.

Next at block B250, the backend device 110 may receive data thread results from the available user devices 140a-140n via the network 130. Each data thread result may correspond to a sent data thread. After the available user devices 140a-140n process the sent data threads (e.g., determining the data thread results), the data thread results may be sent to the backend device 110 by the user devices 140a-140n. In particular embodiments, one of the user devices 140a-140n may process the image/video data related to a particular vertex for a data thread result (e.g., a weighting value) corresponding to that vertex in the manner described.

Next at block B260, the backend device 110 may determine a job outcome for each data job based on the received data thread results. For example, the backend device 110 may store all data thread results corresponding to data threads making up a data job as they are received. Given network characteristics and processing power associated with each user core 150, data thread results making up a data job may be received at different times. Once all data thread results are received, the backend device 110 may determine the job outcome for the entire data job. In other embodiments, the user devices 140a-140n may determine the job outcome in pieces when a large output is anticipated. The pieces of the job outcome may then be compacted into manageable streams. In specific embodiments, weighting values for a vertex (e.g., as determined from various cameras and various frames) may be gathered and computed to determine display confidence level with respect to the color corresponding to the particular vertex.

Next at block B270, the backend device 110 may send the job outcome to the user devices 140a-140n for consumption. In particular embodiments, the user devices 140a-140n may receive the weighting factors (e.g., the job outcomes) with respect to the color corresponding to a particular vertex in the target space and store them within the user device memory 161. The user devices 140a-140n may reconstruct the target space in 3-dimensional reconstruction processes based on the color associated with each vertex with the processing unit 160 and/or the user core 150. Accordingly, the user devices 140a-140n participate in the graphical processing stage by contributing at least a portion of their processing power (through user cores 150) and consuming the end product of the graphical processing.

FIG. 3A is a schematic block diagram illustrating a perspective view of a target space 300 according to various embodiments. FIG. 3B is a schematic block diagram illustrating a frontal view of the target space 300. Referring to FIGS. 1-3B, the target space 300 may be partitioned into a plurality of volumes 310a-310h (e.g., a first volume 310a, a second volume 310b, . . . , an eight volume 310h). Each of the volumes may be associated with a vertex. For example, the first volume 310a may be associated with a first vertex 320a, the second volume 310b may be associated with a second vertex 320b, . . . , the eight volume 310h may be associated with an eighth vertex 320h. Each of the volumes 310a-310h may be of any suitable shape such as, but not limited to cuboids, cubes, and the like.

The volumes 310a-310h and/or the vertices 320a-320h may be predetermined given that the dimensions for the target space 300 may be known. In some embodiments, for a target space 300 of 60' by 30' by 10', there may be 6,000,000 vertices such as, but not limited to, the vertices 320a-320h. A larger number of vertices in a given target space 300 may allow fine detailing of the target space 300.

Each of the vertices 320a-320h may correspond to a portion of a pixel (e.g., $\frac{1}{16}$, $\frac{1}{8}$, $\frac{1}{4}$, $\frac{1}{2}$, or the like), pixel(s), macroblock(s), or the like when projected and displayed in a 3-dimensional context. For example, the user device interface 164 of each of the user devices 140a-140n may be configured to display 3-dimensional projections of the target space 300 based on the vertices 320a-320h. Each vertex may be associated with display characteristics such as, but not limited to, colors, textures, frequency transforms, wavelet transforms, averages, standard deviations. Various embodiments described herein may refer to color as an exemplary display characteristic. One of ordinary skill in the art would know that other display characteristics as stated may also be implemented in a similar manner.

Each display characteristics may be determined based on multi-camera output. For example, multiple cameras may be positioned around the target space 300. Given that the camera pose (position and orientation) may be known in advance, the vertices 320a-320h captured by each camera may be determined. For example, a camera capturing the frontal view of the target space 300 may capture the frontal vertices (e.g., the first vertex 320a, the second vertex 320b, the third vertex 320c, and the fourth vertex 320d). Additional cameras may capture the back, top, bottom, and/or side views of the target space 300 along the dimensions of the target space 300. Thus, a single vertex may be captured by multiple cameras. In particular, the cameras may capture display characteristics associated with each vertex. One display characteristic is the color associated with each vertex.

For each vertex defined within the target space 300, a weighting value may be determined for each possible color associated with the vertex (and the associated volume). Each time a camera captures a vertex (e.g., in an image or a frame of a video) in a first color, the weighting value for the first color will increase by one. Similarly, each time a camera captures a vertex in a second color, the weighting value for the second color will increase by one. Thus, the weighting values are determined (i.e., determining the color for the vertex as captured each of the plurality of cameras capable of capturing the vertex) for each color associated with the vertex. Higher weighting values for a particular color indicates that the vertex has been captured in that particular color by a larger number of cameras, increasing the confidence level that the vertex is associated with the particular color at a given moment in time. In some embodiments, whereas the weighting value for a color (e.g., the first color) exceeds a threshold value, then the vertex may be determined to be associated with the first color. In some embodiments, the user devices 140a-140n may display the video projections of the target space 300 based on the color associated with each vertex. In further embodiments, additional devices that did not contribute to the data processing (e.g., not connected to the network 130 at the time of processing) may also benefit from the processes of the user devices 140a-140n and the backend device 110, and display the video projections of the target space 300 based on the color associated with each vertex.

Displaying the video projections of the target space 300 may be achieved by streaming the job outcome to a CDN in the form of depth videos, which scan and represent the target space 300 from the outside-in. Scanning may involve taking each pixel of the output video and projecting it into the space from each 4-5 surface of a cubic region of interest. The projected vertex value in x, y, z may be re-encoded into R, G, B to stream to the user devices. User devices may then re-interpret the data into a 3-dimensional model in real time for viewing in different perspectives, angle, and distance.

In another approach, standard deviation of all colors may be determined. The average of the colors may be chosen if the standard deviation is below a predetermined threshold. On the other hand, whereas the standard deviation of all potential colors is above a predetermined threshold, it means that the vertex projects to different colors in a substantial number of cameras (e.g., data source 120). Thus, it is likely that the vertex may the interior of a volume in the target space 300 rather than a vertex associated with a color.

The backend device 110 may receive the source data from the cameras surrounding the target space 300. Next, the backend device 110 may partition the source data into a plurality of data threads based on the vertices associated with the target space 300. For example, a portion of a pixel, pixel(s), macroblock(s) of the source data corresponding to a given vertex may be identified (e.g., with respect to block B220) and stored together with the vertex (e.g., with respect to block B230). Also stored together with the vertex (as sometimes identified by a unique vertex ID) are colors identified with the vertex and the corresponding weighting values.

FIG. 4A is a schematic block diagram illustrating an example of a data thread 400 according to various embodiments. The data thread 400 may be any data thread referred to herein. Generally, a data thread may include metadata (e.g., source data location, specific identification of portions of the source data, other suitable processing parameters, and the like) corresponding to the source data, which is stored separately from the metadata. The actual source data may be stored in the data sources 120. Metadata may be of lesser size than actual source data itself, thus is more cost-effective to be moved from the backend device 110 to the user devices 140a-140n. The user devices 140a-140n themselves may retrieve or otherwise access the actual source data for processing based on the metadata stored in the data thread. Alternatively, the data thread may include the source data itself.

Specifically, FIG. 4A illustrates the data thread 400 of an image processing context, where the source data may be images, video frames, a combination thereof, and/or the like.

Referring to FIGS. 1-4A, the data thread 400 may be generated by the backend device 110 (by partitioning the source data in the manner described), stored in the database 170 and/or the memory 112. In some embodiments, the data thread 400 may include at least a location 410, size 420, image data URL 430, and vertex ID 440. The vertex ID 440 may identify a specific vertex (e.g., the first vertex 320a) within the target space 300.

In various embodiments, the image data URL 430 may be an address from which the user devices 140a-140n may access or retrieve a portion of the source data (e.g., an image, frame, and/or the like) corresponding to the data job. In particular embodiments, the image data URL 430 may be a uniform resource locator address for the image/frame (e.g., the data job) as captured by a camera. The image/frame may be stored as the source data on the database 170, the memory 112, or another server. The image/frame may capture a plurality of vertices of the target space 300, including the vertex associated with the vertex ID 440. The location 410 may be a position in the image/frame (as contained in the image data URL 430) associated with the vertex associated with the vertex ID 440. The location 410 may be a fraction of a pixel or at least one pixel. The size 420 refers to the size of the portion (e.g., an area) of the image/fraction associated with the vertex. In other words, the size 420 dictates the area around the location 410 that is associated with the vertex. The size 420 may be $1/16$, $1/8$, $1/4$, $1/2$, 1, 2, 3, 4 pixels (extending in any direction of the image/frame from the location 410), and/or the like. In some embodiments, the size 420 may correspond to the volume associated with each vertex. For example, the larger the volume is, the larger it would appear on the image.

By storing the entire image remotely and sending only sufficient identification information (e.g., the location 410, the size 420, and the image data URL 430) to the user devices 140a-140n for performing data processing, bandwidth may be conserved given that the data size for transmitting image/frame data may be greater than the data size for transmitting the identification information. In other embodiments, the data thread 400 may include the particular portion of the image/frame (as would be otherwise identified by the location 410, the size 420, and the image URL 430) and the vertex ID 440.

FIG. 4B is a schematic block diagram illustrating an example of a thread result 460 according to various embodiments. Referring to FIGS. 1-4B, the thread result 460 may be generated by each of the user devices 140a-140n and transmitted to the backend device 110. The thread result 460 may include at least a data thread result 470 and the vertex ID 440. The data thread result 470 may be the processed results of the data thread 400 as described. In particular embodiments, the data thread result 470 may include a color or an indicator indicating the color associated with the area of the image/frame. For example, the area may be identified by the location 410 and the size 420 of the data thread 400. The image/frame may be contained within the image data URL 430. The source data may be located within the network 130 or anywhere on the internet.

When each of the user devices 140a-140n receives the data thread 400, each of the user devices 140a-140n may retrieve the area of the image/frame associated with the vertex by accessing the image data URL 430 and locating the area with the location 410 and the size 420 as described. Each of the user devices 140a-140n may then determine display characteristics (e.g., color) associated with the area. The color may be transmitted together with the vertex ID 440 back to the backend device 110 in the thread result 460. The backend device 110 may then index the data thread results 470 according to the vertex ID 440. The backend device 110 may increase the weighting value of the color set forth in the data thread result 470 or the vertex associated with the vertex ID 440.

In various embodiments, a single data thread 400 may be sent to a user device 140n at a time. Another data thread 400 may be sent to the user device 140n when the previous data thread 400 has been processed (e.g., the data thread result 460 has been received by the backend device 110). In other embodiments, a block (i.e., a unit of data including a plurality of data threads such as the data thread 400) may be sent to the user devices 140a-140n for distributed processing. Thus, time may be conserved when multiple data threads 400 are transmitted to the user devices 140a-140n.

Figure 5:
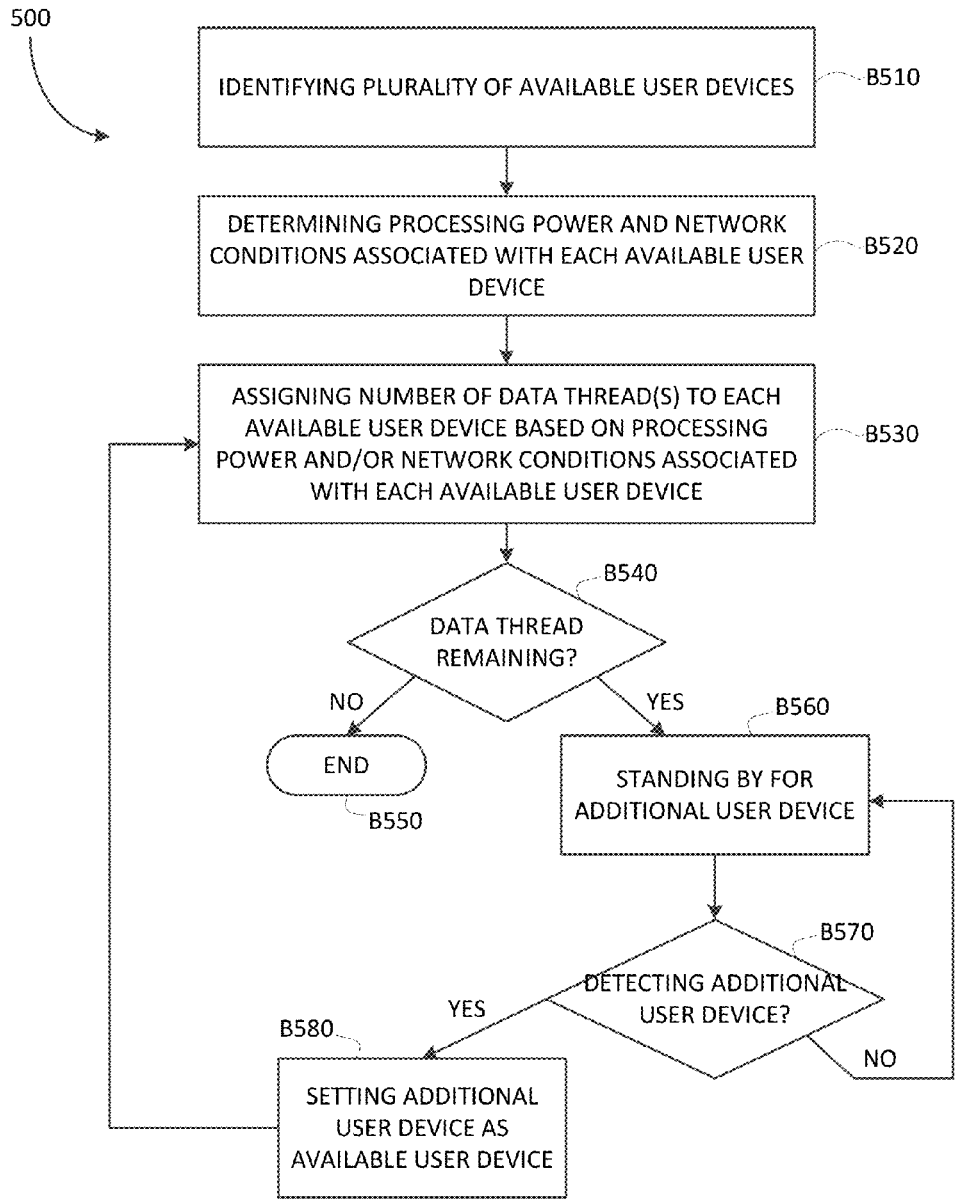
FIG. 5 is a process flowchart illustrating an example of data thread assignment method according to various embodiments.

FIG. 5 is a process flowchart illustrating an example of data thread assignment method 500 according to various embodiments. In various embodiments, the data thread assignment method 500 may correspond to block B240 of the distributed data processing method 200 of FIG. 2.

Now referring to FIGS. 1-5, first at block B510, the backend device 110 may identify a plurality of available user devices (e.g., the user devices 140a-140n). In some embodiments, the available user devices may be identified when the available user devices are connected to the backend device 110 e.g., through the network. In a non-limiting example, the backend device 110 may provide a web service (e.g., in the form of a website) that the user devices 140a-140n may access. The backend device 110 may generate a list of internet protocol (IP) addresses, where each IP address may represent at least one of the user devices 140a-140n. In another non-limiting example, the backend device 110 may provide authentication applications such that each of the user devices 140a-140n may be identified once authentication to the backend device 110 is successful. The database 170 and/or the memory 112 may maintain a list of user devices 140a-140n (as identified by suitable identifiers such as the IP addresses, login credentials, and/or the like).

An identified user device is deemed to be an available user device when it is not currently processing any data threads 400 sent by the backend device 110. Once connected to the backend device 110, one of more of the user devices 140a-140n may become "busy" when they are processing the data threads 400 assigned by the backend device 110.

At block B520, the backend device 110 may determine, with the processor 111, processing power and network conditions associated with each available user device. In some embodiments, the backend device 110 may determine (e.g., via scripts) or cause each available user device to determine the processing power of each available user device. The processing power may refer to the total processing power, the current available processing power (taken into account processing power consumption of processes other than data thread processing), and the like. In some embodiments, the processing power (e.g., the total processing power) may be approximated from the number of user cores 150 available to a given user device 140n. In a non-limiting example, an available user device may be deemed as having high processing power when it has 8 or more user cores 150 while another available user device may be deemed as having low processing power when it has 4 or less user cores 150. In particular embodiments, the number of user core 150 may refer to a number of GPU cores.

In some embodiments, the backend device 110 may determine (e.g., via scripts) the network conditions (e.g., total network bandwidth, available bandwidth, and/or the like) associated with each of the available user device. In further embodiments, the backend device 110 may determine the network conditions associated with the backend device 110 as well.

Next at block B530, the backend device 110 (via the processor 111) may assign a number of data threads for each available user device based on the processing power and/or the network conditions associated with each available device. In general terms, a number of data threads 400 assigned to a given available user device may be greater when the processing power and/or the network conditions are greater. In some embodiments, more data threads 400 may be assigned to a first available user device than to a second available user device, where the first available user device has more processing power (e.g., total processing power, current processing power, and/or the like) as compared to the second available user device. For example, 475 data threads may be assigned to an available user device with 16 user cores 150 while 200 data threads may be assigned to an available user device with 4 user cores 150. In alternative or further embodiments, more data threads 400 may be assigned to a third available user device than to a fourth available user device, where the third available user device has improved network conditions (e.g., more bandwidth, and/or the like) as compared to the third available user device.

The number of data thread(s) assigned to an available user device may be arranged in a block. A block including at least one data thread 400 may be sent to each available user device, and the thread results 460 for each data thread 400 contained in the block may be returned (together, as a unit) to the backend device 110.

Determining the number of data threads 400 (e.g., the size of the block) sent to an available user device at a given instance based on the processing power and the network conditions associated with the available user devices in the manner described can allow efficient data processing for solving the data job. In various embodiments, the block may require a small percentage (e.g., 0.5%, 1%, 2%, 5%, 10%, and/or the like) of the total and/or current processing power of the user cores 150 of the available user devices such that the processing of the block may appear negligible to the user of the available user devices. Accordingly, complex computing tasks such as live-streaming of 3-dimensional target space 300 may be enabled by the distributed computing framework 100, the distributed data processing method 200, and the related disclosure herein.

In various embodiments, the data source 120 may continuously and/or periodically feed source data to the backend device 110 for partitioning (with respect to block B220) and storing (with respect to block B230). For example, video cameras (as the data source 120) may continuously feeding video data (as the source data) to be processed. Thus, as previous data threads 400 are processed by the available user devices, new data threads 460 may be partitioned, stored, and standing by to be processed.

Next at block B540, the backend device 110 may determine (with the processor 111) whether at least one data thread 460 remains unassigned to an available user device. Given that the number of available user devices connected to the backend device 110 may fluctuate over time, all data threads 400 stored in the database 170 and/or the memory 112 at a given time may or may not be immediately assigned to an available user device. When all the stored data threads 400 are assigned at a given time, the distributed computing framework 100 may possess ample processing power (e.g., a sufficient number of user cores 150 are made available to the backend device 110) to process the source data almost instantaneous, subject to only network and processing delays. On the other hand, large number of data threads 400 remaining after assignment at a moment time may indicate insufficient processing power and larger processing time of the source data.

In some embodiments, the resolution of the job outcome may be adjusted based on processing power (e.g., the number of available user cores 150). For example, when a higher number of available user cores 150 (exceeding a predetermined threshold) are connected to the network 130, the job outcome (e.g., processed image data) may be of a higher resolution, which requires more processing power. On the other hand, when a lower number of available user cores 150 (below a predetermined threshold) are connected to the network 130, the job outcome (e.g., processed image data) may be of a lower resolution, which requires less processing power.

Whereas there are no data threads 400 remaining unassigned, the data thread assignment method 500 may be terminated at block B550 (B540:NO). In some examples, there are no data threads 400 remaining when all the outstanding partitioned (with respect to block B220) and stored (with respect to block B230) data threads 400 have been assigned to an available user device. In some embodiments, this may occur when the data source 120 is no longer receiving source data. In other embodiments, this may occur when the data source 120 has not yet transmitted new source data to the backend device 110 or when the backend device 110 has not yet partitioned or stored new data threads 400 corresponding to new source data.

In various embodiments, the backend device 110 may be configured to standby for new data threads 400 to be partitioned/stored when no data thread remains (B540:NO). Upon determining (e.g., with the processor 111) that new data threads 400 are stored, the backend device 110 may assign a number of new data threads 400 for each available user device at the time based on processing power and/or network conditions associated with each available user device such as, but not limited to, described with respect to block B530. The data thread assignment method 500 may continue from block B530 onward (e.g., to blocks B530, B540, B550, B560, B570, and/or B580).

Whereas there are data threads 400 remaining unassigned, the backend device 110 may standby for additional user devices at block B560 (B540:YES). The standing by block B560 may be terminated when the backend device 110 detects at least one additional user device e.g., the user device 140*a*-140*n* at block B570. In some embodiments, a busy user device be detected to be an additional user device when that busy user device (e.g., a user device assigned to process a block of data thread(s)) completes processing the block and returns thread results 460 for each of the data threads 400 contained in the block. In further embodiments, a user device 140*n* that has been identified by the backend device 110 (in a manner such as, but not limited to, as described with respect to block B510) subsequent to the remaining data thread 400 remaining block B540 may be deemed as an additional user device.

The backend device 110 may periodically seek to detect, with the processor 111, whether an additional user device is present. When no additional user device has been detected, the backend device 110 may revert to the standing by at block B560 (B570:NO) until at least one additional user device has been detected. Whereas the at least one additional user device has been detected in the manner described, the backend device 110 may set the detected additional user device as an available device at block B580 (B570:YES). Next, the backend device 110 may assign data thread(s) 400 (remaining data thread(s) and new unprocessed data thread(s) partitioned and stored) to each available (e.g., additional) user device based on processing power and/or network conditions associated with each available user device such as, but not limited to, as described with respect to block B530.

Figure 6:
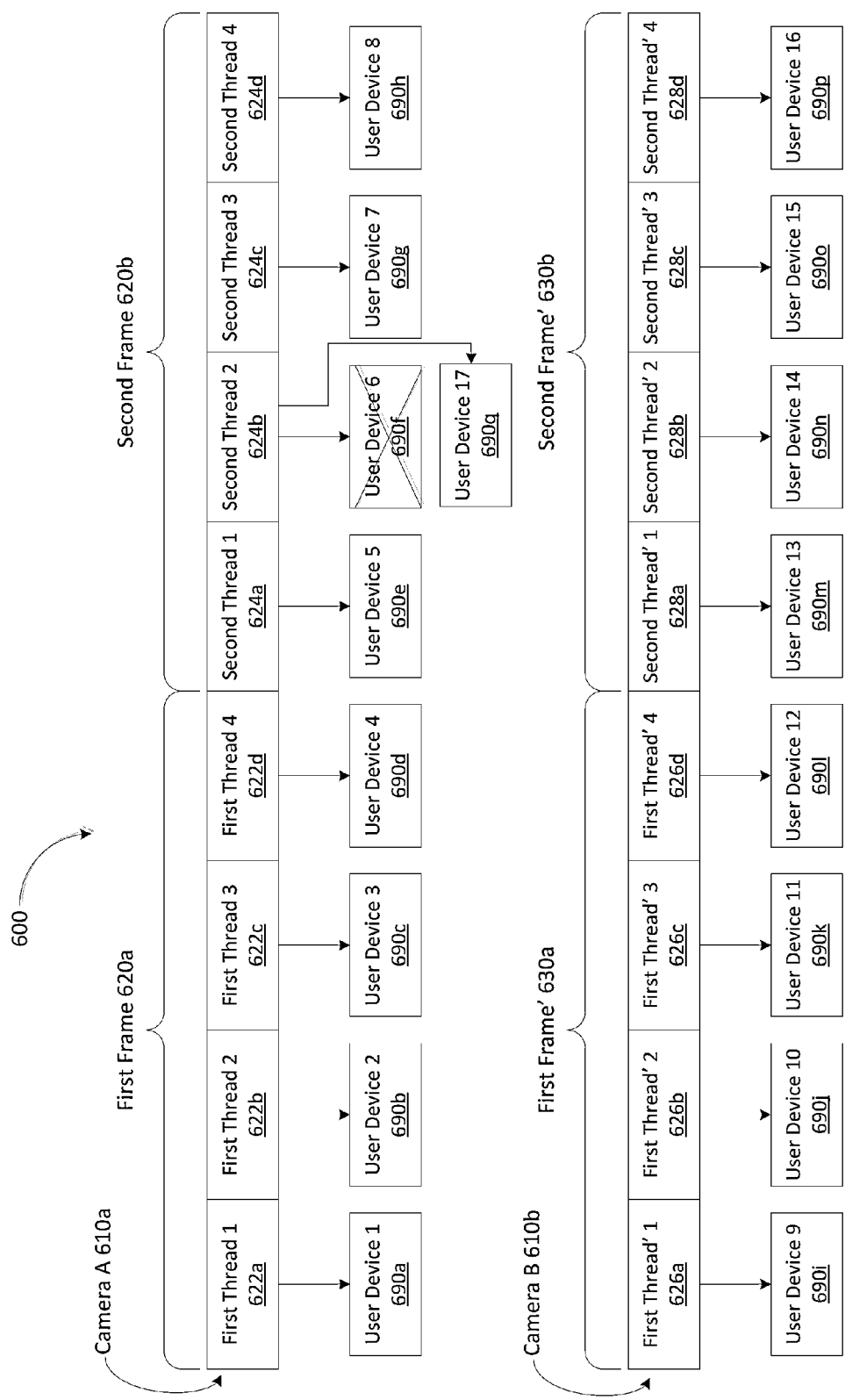
FIG. 6 is a schematic block diagram illustrating an example of data thread assignment and reassignment diagram according to various embodiments.

FIG. 6 is a schematic block diagram illustrating an example of data thread assignment and reassignment diagram 600 according to various embodiments. In various embodiments, the data thread assignment and reassignment diagram 600 may correspond to block B240 of the distributed data processing method 200 of FIG. 2.

Now referring to FIGS. 1-6, data sources 120 may include a first camera (e.g., camera A 610*a*) and a second camera (e.g., camera B 620*b*). Each of the camera A 610*a* and the camera B 610*b* may feed image/video data as the source data to the backend device 110 to be partitioned and stored for processing as described. For example, the camera A 610*a* may send a first frame 620*a* and a second frame 620*b* to the backend device 110. The first frame 620*a* and the second frame 620*b* may be consecutive frames. The camera B 610*b* may send a first frame' 630*a* and a second frame' 630*b* to the backend device **110*. The first frame' 630*a* and the second frame' 630*b* may be consecutive frames.

Each of the first frame 620*a*, the second frame 620*b*, the first frame' 630*a*, the second frame' 630*b* may be divided into a plurality of data threads (such as, but not limited to, the data thread 400) by the processor 111 of the backend device 110. As described, each frame may include a plurality of areas. Each area may correspond to a vertex (such as, but not limited to, the vertices 320*a*-320*g*) within a given space (such as, but not limited to, the target space 300). For example, the first frame 620*a* may include a first thread 1 622*a*, a first thread 2 622*b*, a first thread 3 622*c*, and a first thread 4 622*d*. In various embodiments, each frame may include 400, 1,000, 5,000, 20,000, 360,000 data threads. For illustrative purposes, only 4 data threads for each frame are illustrated.

Each of the data threads (e.g., the first thread 1 622*a*-first thread 4 622*d*, second thread 1 624*a*-second thread 4 624*d*, the first thread' 1 626*a*-first thread' 4 626*d*, and second thread 1 628*a*-second thread 4 628*d*) may be assigned to an available user device as identified, for example, with respect to block B510. The first thread 1 622*a* may be assigned to a user device 1 690*a*, a first thread 2 622*b* may be assigned to a user device 2 690*b*, . . . , and the second thread' 4 may be assigned to a user device 16 690*p*. It should be appreciated that blocks of various sizes (e.g., containing various numbers of data threads) may be assigned to different user devices. One data thread is shown to be assigned to a disparate user device for simplicity.

Second thread 2 624*b* may be assigned (initially) to a user device 6 690*f* for processing. In some embodiments, the processing of a data thread 400 assigned to an available user device (e.g., the user device 6 690*f*) may fail for various reasons such as, but not limited to, network failure, active disconnection from the backend device 110, processing failure, unsuccessful transmission of the data thread 400 or the result thread (e.g., the data thread result 470), a combination thereof, and/or the like. The backend device 110 may detect such failures and reassign the second thread 2 624*b* to another user device (e.g., the user device 17 690*q*) for processing.

In some embodiments, data threads 400 corresponding to frames received prior in time for a given camera (e.g., the camera A 610*a*) may be prioritized (by the processor 111 of the backend device 110) over frames of the same camera or another camera (e.g., camera B 610*b*) received later in time. Prioritizing one data thread 400 over another refers to the one data thread 400 being assigned an available user device while the another data thread 400 being assigned to another user device only when an additional user device is available. In other words, when a data thread from a prior frame (e.g., the first thread 1 622a) and a data thread from a later frame (e.g., the second thread 1 624a) are standing by to be assigned to a user device, the data thread 400 from the prior frame may be assigned to an available user device first. For example, the first thread 1 622a (instead of the second thread 1 624a) may be assigned to the user device 1 690a when only the user device 1 690a is available at the time of assignment. The second thread 1 624a may be assigned to the user device 5 690e when the user device 5 690e becomes available at a later time.

In some embodiments, a failed data thread 400 corresponding to a frame received prior a given camera may be prioritized (by the processor 111 of the backend device 110) over data threads corresponding to frames of a same or different camera. In particular embodiments, failed data thread 400 may be prioritized only over data threads 400 of a subsequent frame (of a same or different camera) yet to be processed.

Accordingly, multiple data threads 400 (or blocks) may be processed in parallel asynchronously over multiple user devices 140a-140n (or user cores 150). Each data thread 400/block may be processed by a user device 140n independent of the processes of other user devices 140a-140n for other data threads 400/blocks. Any user device 140n can process any data thread 400 when the user device 140n becomes available for processing. It should be noted that prioritizing of data threads based on time (e.g., the sequential ordering of frames) and processing status (e.g., failed data threads may be processed first with an available user device to control stream delaying) may be implemented to optimize the process as described.

Advantages associated with the distributed data processing systems and methods also include free scaling of processing power. The processing power of the distributed data processing systems may depend on the number of user devices 140a-140n connected to the backend device 110 (e.g., which may be an asynchronous NoSql metadata server). The processing power is scaled up when more user devices 140a-140n are connected to the backend device 110, vice versa.

In some embodiments, the data processing at the user device (e.g., the user devices 140a-140n) may be executed (e.g., as trigger in a web browser) without requiring special plugins, thus simplifying the data processing. For example, each of the user devices 140a-140n may be a HTML5 capable web client that may execute data processing in the manner described without the use of plugins. In some embodiments, all barriers to connect the user devices 140a-140n to the backend device 110 and to retrieve unprocessed data may be eliminated. No software is required to be downloaded for processing. The data processing requires minimal processing power of the user devices 140a-140n as compared to the total or currently available processing power. In various embodiments, the data processing of the data threads 400/blocks has very little impact, if any, on the user experience of using the user devices 140a-140n.

Figure 7:
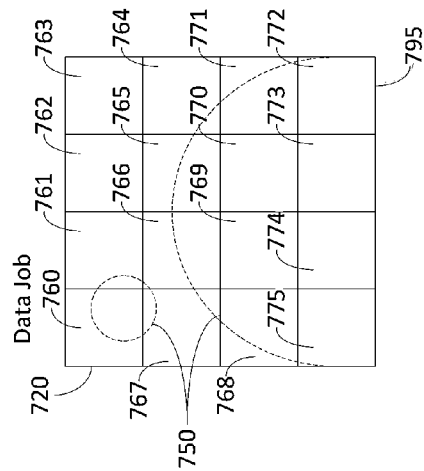
FIG. 7 is a screen illustrating an example of a management interface in some embodiments.

FIG. 7 is an example screen illustrating a management interface 700 in some embodiments. The management interface 700 may be displayed by the user interface 114 of the backend device 110 to designated personnel operating the backend device 110. Through the management interface 700, the designated personnel may monitor the distributed data process (e.g., the distributed data processing method 200 of FIG. 2, the data thread assignment method 500 of FIG. 5, the data processing method 800 of FIG. 8, a combination thereof, and/or the like).

Referring to FIGS. 1-7, the management interface 700 may be configured as a window interface being displayed by the display device of the user interface 114 of the backend device 110. The management interface 700 may include at least a devices table 710 and a data job diagram 720. The devices table 710 and/or the data job diagram 720 may be arranged in any suitable positions, sizes, orientation within the management interface 700. The management interface 700 may include an option to purchase additional user devices (such as user devices 140a-140n) from a third-party cores (such the a user core 150) provider when the available user devices 140a-140n connected to the network 130 may not be enough to process the computing task (e.g., the source data).

The devices table 710 may list a plurality of user devices (e.g., the user devices 140a-140n) connected to the backend device 110. In other words, the devices table 710 may display the available user devices as identified with respect to block B510. Each of the available user devices may be listed in separate entries (e.g., rows) such as, but not limited to, a first entry 740a, a second entry 740b, a third entry 740c, a fourth entry 740d, and a fifth entry 740e. Additional entries may be displayed in the devices table 710.

Each of the available user device may be identified by an unique identification such as, but not limited to, the IP addresses listed in the IP address column 715. For example, each of the entries 740a-740e may include a corresponding IP address identified in the IP address column 715. Each IP address may be associated with two or more of the user devices. For each of the entries 740a-740e, a total number of cores is displayed in the total cores column 730 according to some embodiments. Each of the user device may be associated with at least one core. For example, the user device associated with the first entry 740a (with IP address 75.82.189.xx) may include 32 cores. In another example, the user device associated with the fifth entry 740e (with IP address 79.61.525.xx) may include only 4 cores.

The execution time (as shown in the execution time column 735) associated with each IP address may be displayed in the devices table 710. In some embodiments, the execution time may be an average time required to process one of the assigned data threads. Thus, the execution time associated with each IP address may depend on the processing power (e.g., the higher processing power may be associated with faster execution time). For example, the user device associated with the first entry 740a (with IP address 75.82.189.xx) may require 25.2 ms to execute each data thread assigned. In another example, the user device associated with the fifth entry 740e (with IP address 79.61.525.xx) may require 41.7 ms to execute each data thread assigned. In other embodiments, the execution time may take into account network conditions. For example, the execution time may be measured from transmission of the data thread by the backend device 110 to the receiving of the thread result, thus taking into account network transmission delays.

In some embodiments, the devices table 710 may include a number of data threads processed and/or a number of data threads assigned to the corresponding IP address by the backend device 110. For example, the user device associated with the first entry 740a (with IP address 75.82.189.xx) may be assigned 475 data threads to process, all of which have been processed. In another example, the user device associated with the fifth entry 740e (with IP address 79.61.525.xx) may be assigned 100 data threads to process, 10 of which have been processed.

In some embodiments, the devices table 710 may include a frames per second (FPS) as indicated in the FPS column 755 corresponding to each IP address listed in the IP address column 715. FPS indicates performance in consuming the job results, which is determined by the backend device 110 based on the thread result 460 from each of the available user devices. The job results may be transmitted to the user devices 140a-140n for consumption. The job results may be weighting values associated with each vertex (e.g., the vertices 320a-320h) within a target space (e.g., the target space 300) for live 3-dimensional streaming. Increase in processing capabilities and network conditions may lead to higher FPS, vice versa.

The data job diagram 720 may illustrate the source data and/or the data job. In some embodiments, a data job may be processing graphics data. Specifically, the data job shown in the data job diagram 720 is to process a frame 795 including captured data 750. As described each data job may be segmented into a plurality of data threads (e.g., data threads 760-775). Each data thread may be associated with a disparate area within the frame 795.

In further embodiments, the management interface 700 may include graphs and diagrams that graphically illustrate the processed data jobs with respect to the overall number of data jobs, time, number of cores, number of available/bus user devices, a combination thereof, and/or the like.

Figure 8:
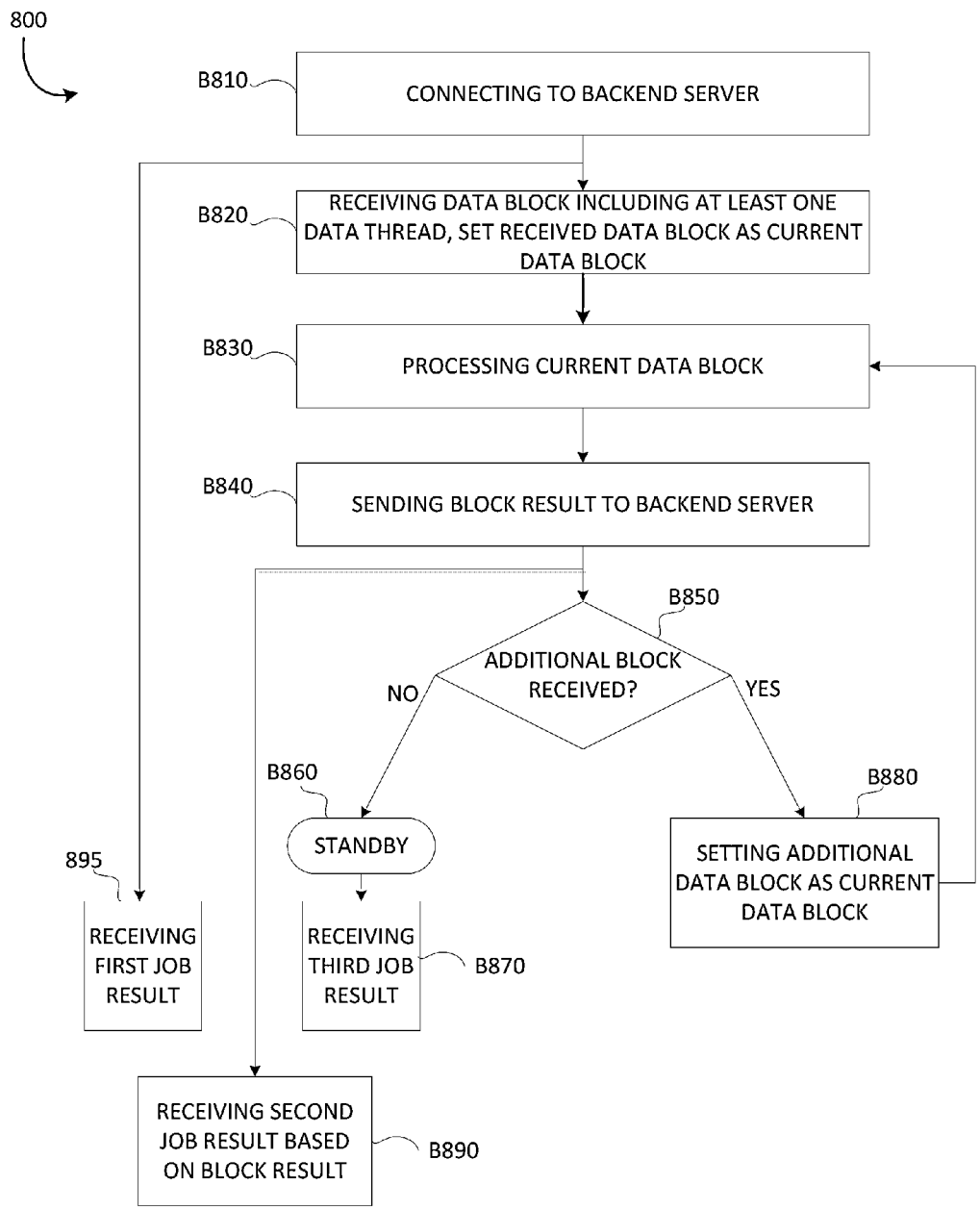
FIG. 8 is a process flowchart illustrating an example of a data processing method according to various embodiments.

FIG. 8 is a process flowchart illustrating an example of a data processing method 800 according to various embodiments. The data processing method 800 may be performed by a user device (e.g., the user devices 140a-140n). Referring to FIGS. 1-8, the user device 140n may connect to the backend server 110 at block B810. In various embodiments, the user device 140n may connect (via the user network device 163) to the backend device 110 by assessing a website hosted by the backend device 110 or by logging onto the backend device 110. In other words, the user device 140n may be connected to the backend device 110 when it has been identified by the backend device 110 according to block B510.

Next at block B820, the user device 140n may receive a data block including at least one data thread 460, there the data block is set to be the current data block. In some embodiments, the backend device 110 may periodically push the data blocks/threads to the user devices 140a-140n in the manner described. In other embodiments, each of the user devices 140a-140n may transmit a request to the backend device 110 (when data processing is complete) to receive a new data block/thread to process, in a pull. The data sent to be backend devices 140a-140n may be based on a prioritized list of data blocks/threads in the manner described.

Next at block B830, the user device 140n may be configured to process the current data block. In some embodiments, processing the current data block may include determining the weighting value for a color associated with an area of the frame, the area corresponding to a vertex (e.g., the vertices 320a-320h) within the target space 300. Next at block B840, the user device 140n may send block result to the backend server 110. The block result may include at least one data thread result 470.

Next at block B850, the user device 140n may determine whether an additional data block has been received from the backend device 110. When no additional data block has been received from the backend device 110 by the user device 140n, the user device 140n may standby at block B860 (B850: NO). On the other hand, whereas at least one additional data block has been received from the backend device 110 by the user device 140n, the user device 140n may be configured to set the additional data block as the current data block at block B880 (B850:NO) to be processed at block B830.

After connecting to the backend device 110 at block B810, the user device 140n may receive a first job result from the backend device 110 for consumption at block B895. The first job result may be based on block results outputted by user devices (e.g., the user device 140a, the user device 140b, ..., the user device 140n-1) other than the user device 140n. For example, the first job result may be determined based on data threads/blocks processed previously by other user devices before the user device n 140n is connected to the backend device.

After sending the block result to the backend server 110 at block B840, the user device 140n may receive a second job result from the backend device 110 for consumption at block B890. The second job result may be based on block results outputted by user devices (e.g., the user device 140a, the user device 140b, ..., the user device 140n-1) as well as the user device 140n.

When the user device 140n is standing by at block B860 as it does not receive any data blocks to process, the user device 140n may receive a third job result from the backend device 110 for consumption at block B870. The third job result may be based on block results outputted by user devices (e.g., the user device 140a, the user device 140b, ..., the user device 140n-1) other than the user device 140n.

The job results (e.g., the weighting values associated with the vertices 320a-320h) may be used to determine a 3-dimensional projection of the target space 300 for outputting live 3-dimensional videos by the user device interface 164.

Figure 9:
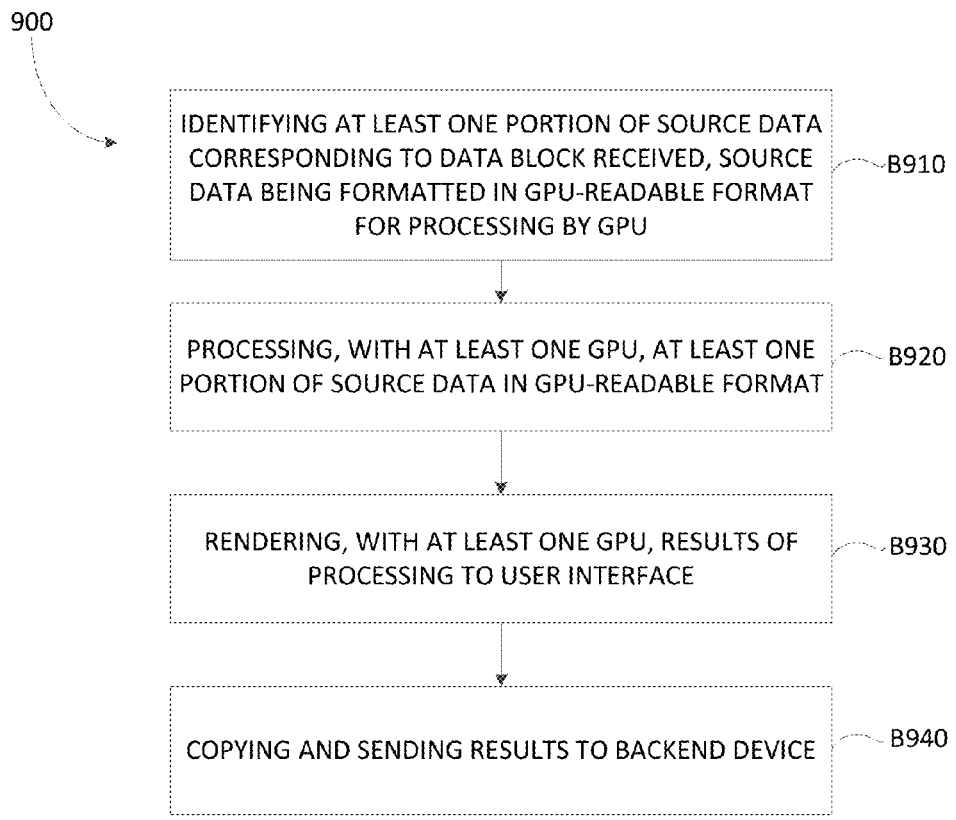
FIG. 9 is a process flow chart illustrating an example of a GPU-oriented distributed data processing method according to various embodiments.

FIG. 9 is a process flow chart illustrating an example of a GPU-oriented distributed data processing method 900 according to various embodiments. Referring to FIGS. 1-9, the GPU-oriented distributed data processing method 900 may be particular implementations of the distributed data processing method 200, the data processing method 800, and/or related systems and processes described herein. For example, the GPU-oriented distributed data processing method 900 may correspond to block B830 of data processing method 800. The GPU-oriented distributed data processing method 900 may be implemented with user devices such as, but not limited to, the user devices 140a-140n. In particular embodiments of the GPU-oriented distributed data processing method 900, at least one GPU may be implemented as the user core 150 of the user devices.

First at block B910, the user device (via its processing unit 160 or its GPU core) may identify at least one portion of source data corresponding to data block received (e.g., at block B830), the source data being formatted in GPU-compatible format for processing by the GPU of the user device. The source data may be encoded or formatted according to GPU-compatible format (by the backend device 110 or by the data source 120) for processing by the GPUs of the user devices. For example, shader language standards may be used for GPU processing. The source data may be encoded or otherwise formatted into elements such as, but not limited to, geometry, vertices, textures, normals, the code for the shader language itself, and/or the like. Once converted, the source data may be streamed or otherwise sent into the shader for GPU processing. In particular embodiments, the source data (e.g. images or frames of videos) may be formatted into textures (as compared to other elements) for fast GPU processing (e.g., at 120 fps).

The data block may include at least one data thread, each data thread may include metadata (e.g., location of the actual source data, particular identifiers of the portions of the source data, processing parameters, and/or the like) corresponding to the source data (e.g., an image or a frame of a video). Based on the location (e.g., URL data) of the source data and the identifier of the portion of the source data relating to this data thread (e.g., coordinates of an area of the image/frame), the user device may locate and retrieve the relevant portions of the source data for processing from the data sources 120. This may occur once the source data has been received at the user device in shader (or other suitable GPU-compatible format) format.

Next at block B920, the user device may process, with at least one GPU, the at least one portion (as identified in block B910) of the source data in GPU-compatible format (e.g., in shader language as described). Generally, the processes may relate to any processes involving a string of math functions, which may also take advantage of OpelGL optimized pipeline for matric math and low level functions to complete in an efficient manner.

In some particular embodiments, such processes may involve projecting a 2-dimensional image (which is formatted in shader language as a texture or other suitable elements) to a set of vertices (e.g., vertices 320a-320h) defined within a target space (e.g., the target space 300). For example, a set of all vertices of the target space or a portion thereof (e.g., a subset of the entire set of vertices, the subset of vertices may be arranged in suitable manner such as in a line, a plane, in a volume, or the like) may be set with the data blocks/threads or separately via other data units to the user devices. The user device may project at least one of the vertices received to an area of the frame/image as identified by the metadata sent as the data blocks/threads.

In other or further particular embodiments, the user device may determine, with its GPU, display characteristics of an area of the frame/image, which corresponds to at least one vertex. By way of illustrating with a non-limiting example, the user device may be configured to average a number of surrounding pixels with respect to a target pixel (which may be an area of an image identified by the data thread) to output the average as the color for the target pixel.

Next at block B930, the user device may render, with the at least one GPU, results of the processing (e.g., at block B920) to the user interface 164 (e.g., the display device of the user interface 164) of the user device. After processing is completed, the GPU may render the results to the screen of the user device. Next at block B940, the user device may copy and send the rendered results back to the backend device 110 or another remote storage for aggregation any computing the job outcome in the manner described. Accordingly, the processed results may be readily and speedily transmitted out of the GPU and the user device.

Figure 10:
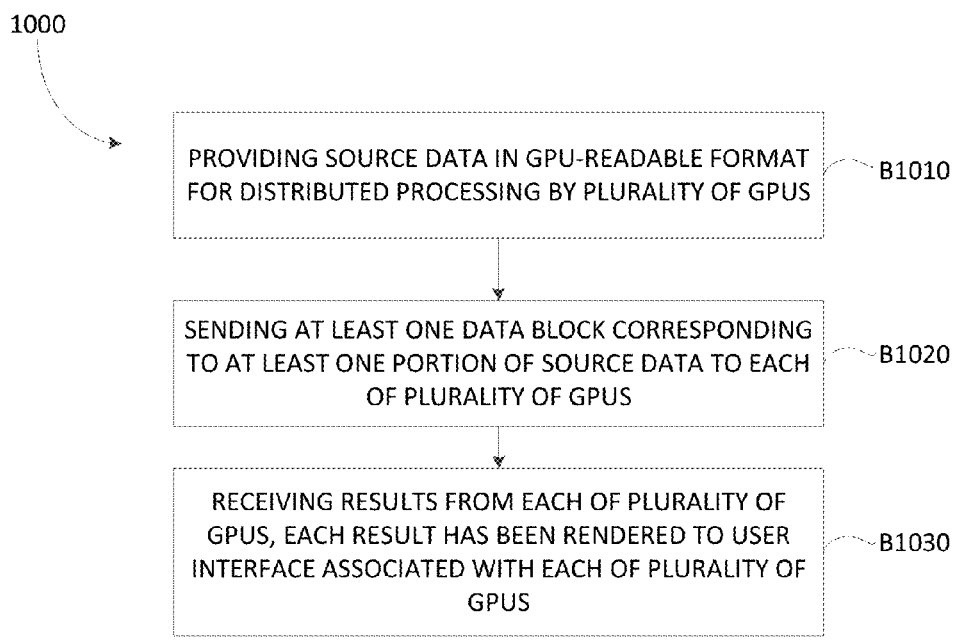
FIG. 10 is a process flow chart illustrating another example of a GPU-oriented distributed data processing method according to various embodiments.

FIG. 10 is a process flow chart illustrating another example of a GPU-oriented distributed data processing method 1000 according to various embodiments. Referring to FIGS. 1-10, the GPU-oriented distributed data processing method 1000 may be particular implementations of the distributed data processing method 200 and/or related systems and processes described herein. For example, the GPU-oriented distributed data processing method 1000 may correspond to blocks B240 and B250 of the distributed data processing method 200. The GPU-oriented distributed data processing method 1000 may be implemented with the backend device 110. In particular embodiments of the GPU-oriented distributed data processing method 1000, at least one GPU may be implemented as the user core 150 of the user devices.

First at block B1010, the backend device 110 (or the data source 120, or another device) may provide source data in GPU-compatible format for distributed processing by a plurality of GPUs. Each GPU may be associated with a user device. For example, shader language standards may be used to program GPU processing. The source data may be encoded or otherwise formatted into elements such as, but not limited to, geometry, vertices, textures, normals, and the code for the shader language itself. Once converted, the source data may be streamed or otherwise sent into the shader for GPU processing. In particular embodiments, the source data may be converted into textures (as compared to other elements) for fast GPU processing (e.g., at 120 fps).

Next at block B1020, the backend device 110 may send at least one data block corresponding to at least one portion of the source data to each of the plurality of GPUs in the manner such as, but not limited to, in block B240. The at least one data block may include at least one data thread, each data thread may include metadata (e.g., location of the source data, particular identifiers of the portions of the source data, processing parameters, and/or the like) corresponding to the source data (e.g., an image or a frame of a video). Based on the location (e.g., URL data) of the source data and the identifier of the portions of the source data relating to this data thread (e.g., coordinates of an area of the image), the user device may locate and retrieve the relevant portions of the source data for processing. This may occur once the source data has been received at the user device in shader format.

Next at block B1030, backend device 110 may receive results from each of the plurality of GPUs, each result has been rendered to the user interface 164 associated with each of the plurality of GPUs in a manner such as, but not limited to, block B250. The user device may process, with at least one GPU, the at least one portion (as identified in block B910) of the source data in GPU-compatible format (e.g., in shader language as described) in a manner such as, but not limited to, described with respect to block B920. The GPUs may then render the results to the user interface such as described with respect to B930. and copied and transmitted to the backend device 110 at block B940.

Various particular implementations of the asynchronous computing web framework may be related to image/video processing (e.g., filtering images, facial recognition in images, 3-dimensional projections, and the like), processing of gene data, currency arbitrage data, weather data, vertex data, chemical formulas, or other arbitrary data required by distributed computing tasks. In other words, the source data may be any parallel data set. In some embodiments, different data sets may take advantage of geographic distribution of the user devices 140a-140n to enable solutions for big data problems.

In some additional embodiments, the distributed computing processing framework 100 may be implemented to solve currency exchange arbitrage algorithms (for example, using the Bellman Ford shortest path algorithm, which determines infinite loop cycles when a log of the currency exchange rates are taken). In some embodiments, each of the user devices 140a-140n may be associated with a currency. The associated currency (the data of which may be in the form of data blocks/threads) may be assigned by the backend device 110 based on geographical location associated with each of the user devices 140a-140n (i.e., each of the user devices 140a-140n may be assigned the currency used in the geographical location). As such, when a user device 140a-140n detects an infinite loop cycle corresponding to the assigned currency, it may be closer to a financial institution which can trade the assigned currency most efficiently. For example, the user device may be in or proximal to the financial institution. The user devices 140a-140n may be connected to the backend device 110 using a browser or connecting to a social network using the distributed computing framework 100 in the background for data processing, which the users of the user devices 140a-140n are unaware. Accordingly, such distributed computing framework 100 may out-scale centralized arbitrage super computers as bandwidth capabilities of the network 130 increase. The distributed computing framework 100 (e.g., the backend device 110) may be implemented with social networks (as the network 130).

In some additional embodiments, raw video/image data (e.g., as the source data) may be spread out and encoded in parallel overlapping segments (e.g., received at block B210, partitioned at block B220, stored at block B230, and sent at block B240), each segment may be treated as a data block/thread to be processed by a separate one of the user devices 140a-140n. As such, any data block/thread may complete processing (e.g., at block B250-B260) before any encoding system can finish encoding an entire video/image. As such, all the segments of the raw video/image data may be done at once, around the same time. Servers with large amount of user devices 140a-140n (e.g., social network sites) may provide unprecedented amount of processing power.

In some additional embodiments, gene sequence data may be receive (e.g., at block B210), partitioned (e.g., at block B220), and stored (e.g., at block B230) as data blocks/threads. The data blocks/threads may be sent to the user devices 140a-140n (e.g., at block B240) for processing (e.g., at block B250). In particular, the gene sequence data may be divided based on gene classifications (at block B220) for parallel processing. Search windows may be provided across strings of DNA and sent into the distributed computing framework 100 for automated classification.

In other additional embodiments, images stored on social networks may be processed slowly over time to automatically identify any arbitrary corners or features, then send to the user devices 140a-140n to identify the corners or features when sufficient number of the corners or features have been identified together to form objects and people. Overtime, all objects and people can be automatically learned by the distributed computing network 100, which is constantly being taught by its users' inputs. The identification processes may be achieved virtually costless to the social networks, as the identification processes are completed by the user devices 140a-140n connected to the network 130 (e.g., the social networks).

Various embodiments described above with reference to FIGS. 1-8 include the performance of various processes or tasks. In various embodiments, such processes or tasks may be performed through the execution of computer code read from computer-readable storage media. For example, in various embodiments, one or more computer-readable storage mediums store one or more computer programs that, when executed by a processor cause the processor to perform processes or tasks as described with respect to the processor in the above embodiments. Also, in various embodiments, one or more computer-readable storage mediums store one or more computer programs that, when executed by a device, cause the computer to perform processes or tasks as described with respect to the devices mentioned in the above embodiments. In various embodiments, one or more computer-readable storage mediums store one or more computer programs that, when executed by a database, cause the database to perform processes or tasks as described with respect to the database in the above embodiments.

Thus, embodiments include program products including computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can include semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may include, for example, instructions and data which cause a computer or processing machine to perform certain functions, calculations, actions, or the like.

The embodiments disclosed herein are to be considered in all respects as illustrative, and not restrictive. The present disclosure is in no way limited to the embodiments described above. Various modifications and changes may be made to the embodiments without departing from the spirit and scope of the disclosure. Various modifications and changes that come within the meaning and range of equivalency of the claims are intended to be within the scope of the disclosure.

What is claimed is:

1. A method for processing data, the method comprising:
receiving, by a backend device, source data related to a target space, the target space is defined by a plurality of vertices;
partitioning, by the backend device, the source data into a plurality of data threads, each of the plurality of data threads is associated with at least one of the plurality of vertices;
sending, by the backend device, at least one of the plurality of data threads to each of a plurality of user devices;
receiving a plurality of data thread results from the plurality of user devices, each of the plurality of data thread results corresponds to at least one of the plurality of data threads, wherein each of the plurality of data thread results comprises at least one display characteristic associated with at least one of the plurality of vertices; and
determining, by the backend device, a job outcome for the source data based on the plurality of data thread results;
wherein the job outcome comprises weighting factors for display characteristics associated with each of the plurality of vertices.

2. The method of claim 1, wherein:
the source data is a captured video frame.

3. The method of claim 2, wherein:
partitioning of the source data into the plurality of data threads comprises partitioning the captured video frame into a plurality of areas based on metadata associated with the captured video frame and the plurality of areas, each of the plurality of areas corresponds to one of the plurality of data threads.

4. The method of claim 2, wherein the partitioning of the source data into the plurality of data threads comprises partitioning the source data based on pixels of the source data.

5. The method of claim 2, wherein the frame is an image of a target space.

6. The method of claim 5, wherein;
the target space comprises of a plurality of vertices; and
each of the plurality of vertices corresponds to a 3-dimensional portion of the target space.

7. The method of claim 6, wherein:
each of the plurality of data threads is associated with at least one of the plurality of vertices; and
each of the plurality of data threads corresponds to an area of the image.

8. The method of claim 7, wherein each of the data thread results is determined by determining a weighting value associated with at least one display characteristics associated with the area of the image.

9. The method of claim 8, wherein the display characteristics comprises at least a color associated with the area of the image.

10. The method of claim 6, wherein the image captures at least some of the plurality of vertices.

11. The method of claim 1, wherein determining the job outcome comprises:
    receiving, by the backend device, the plurality of data thread results from the plurality of user devices; and
    determining the job outcome for the data job based on the received plurality of data thread results.

12. The method of claim 1, wherein sending the at least one of the plurality of data threads comprises:
    determining at least one of processing power and network conditions for each of the plurality of user devices; and
    assigning each of the plurality of user devices at least one of the plurality of data threads based on at least one of the processing power and the network conditions.

13. The method of claim 1, further comprising formatting the source data into graphic processing unit (GPU)-compatible format, wherein each of the plurality of data thread results is determined by at least one GPU associated with each of the plurality of user devices.

14. The method of claim 13, wherein the GPU-compatible format is associated with shader language.

15. The method of claim 14, wherein the source data is formatted into at least one of the following elements: geometry, vertices, textures, normals, and code for the shader language.

16. The method of claim 1, further comprising receiving, by the backend device, the plurality of data thread results after the plurality of data thread results have been rendered to the display screen associated with each of the user devices.

17. The method of claim 1, further comprising streaming the job outcome to a Content Delivery Network (CDN) in the form of depth videos.

18. An apparatus for processing data, the apparatus comprising:
    a backend device, the backend device is configured to:
        receive source data related to a target space, the target space is defined by a plurality of vertices;
        partition the source data into a plurality of data threads, each of the plurality of data threads is associated with at least one of the plurality of vertices;
        send at least one of the plurality of data threads to each of a plurality of user devices;
        receive a plurality of data thread results from the plurality of user devices, each of the plurality of data thread results corresponds to at least one of the plurality of data threads, wherein each of the plurality of data thread results comprises at least one display characteristic associated with at least one of the plurality of vertices; and
        determine a job outcome for the source data based on the plurality of data thread results;
        wherein the job outcome comprises weighting factors for display characteristics associated with each of the plurality of vertices.

19. A non-transitory computer-readable storage medium storing program instructions that, when executed, causes a processor to:
    receive source data related to a target space, the target space is defined by a plurality of vertices;
    partition the source data into a plurality of data threads, each of the plurality of data threads is associated with at least one of the plurality of vertices;
    send at least one of the plurality of data threads to each of a plurality of user devices;
    receive a plurality of data thread results from the plurality of user devices, each of the plurality of data thread results corresponds to at least one of the plurality of data threads, wherein each of the plurality of data thread results comprises at least one display characteristic associated with at least one of the plurality of vertices; and
    determine a job outcome for the source data based on a plurality of data thread results;
    wherein the job outcome comprises weighting factors for display characteristics associated with each of the plurality of vertices.

20. A method for processing data by a user device, the method comprising:
    receiving, from a backend device, a data thread, the thread corresponds to at least one of an image or a video frame capturing at least one of a plurality of vertices defining a target space;
    determining a data thread result, the data thread result comprising at least one display determining a data thread result, the data thread result comprising at least one display characteristic associated with each of the at least one of the plurality of vertices;
    sending the data thread result to the backend device;
    receiving, from the backend device, a job outcome, wherein the job outcome is determined based, at least in part, on the data thread result; and
    displaying a 3-dimensional projection of the target space based on the job outcome;
    wherein the job outcome comprises weighting factors for display characteristics associated with each of the plurality of vertices.

21. The method of claim 20, wherein the data thread results are determined by:
    rendering the data thread results to a display screen of the user devices; and
    copying the data thread results rendered to the display screen.

* * * * *